United States Patent
Do et al.

(10) Patent No.: US 10,833,951 B2
(45) Date of Patent: Nov. 10, 2020

(54) SYSTEM AND METHOD FOR PROVIDING INTELLIGENT DIAGNOSTIC SUPPORT FOR CLOUD-BASED INFRASTRUCTURE

(71) Applicant: TELEFONAKTIEBOLAGET LM ERICSSON (PUBL), Stockholm (SE)

(72) Inventors: Hoang Huy Do, Plano, TX (US); Sergey Odobetskiy, Oakville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/377,024

(22) Filed: Apr. 5, 2019

(65) Prior Publication Data

US 2020/0145299 A1  May 7, 2020

Related U.S. Application Data

(60) Provisional application No. 62/756,447, filed on Nov. 6, 2018.

(51) Int. Cl.
*H04L 12/24* (2006.01)
*H04L 29/08* (2006.01)

(52) U.S. Cl.
CPC .............. *H04L 41/14* (2013.01); *H04L 41/16* (2013.01); *H04L 67/10* (2013.01)

(58) Field of Classification Search
CPC ......... H04L 41/14; H04L 41/16; H04L 67/10; H04L 41/0816; H04L 41/0813; H04L 43/08; H04L 41/082; H04L 41/0853; H04L 41/145; H04L 41/147; G06F 9/5077; G06F 9/45558
See application file for complete search history.

(56) References Cited

U.S. PATENT DOCUMENTS 9,444,716 B2 * 9/2016 Astigarraga ............ H04L 43/16
9,614,745 B2    4/2017 Mathur et al.
9,967,168 B2    5/2018 Wang
(Continued)

OTHER PUBLICATIONS

Blanco et al., "Technology pillars in the architecture of future 5G mobile networks: NFV, MEC and SDN", Computer Standards and Interfaces, Oct. 12, 2016, 37 pages.
(Continued)

*Primary Examiner* — Aaron N Strange

(57) ABSTRACT

A cloud infrastructure diagnostics system comprises a cloud state configuration module operative to define a cloud state model with respect to a cloud infrastructure, wherein the cloud state model comprises a structured collection of selected operational characteristics relative to the cloud infrastructure components. The cloud state model may include a definition of dependencies between the cloud infrastructure components where applicable. A cloud state monitoring module is operative, responsive to the cloud state model definition, to collect periodic cloud state updates with respect to the cloud infrastructure. A cloud state analysis module is operative, responsive to receiving the periodic cloud state updates, to perform: comparing one or more cloud state updates to a corresponding predefined set of reference states; and determining one or more notifications to be transmitted with respect to the operational characteristics of the cloud infrastructure components.

17 Claims, 13 Drawing Sheets

(56) References Cited

U.S. PATENT DOCUMENTS

| | | | |
|---|---|---|---|
| 10,142,887 B2 | 11/2018 | Broustis et al. | |
| 10,275,326 B1* | 4/2019 | Stickle | G06F 11/2002 |
| 2013/0060933 A1 | 3/2013 | Tung et al. | |
| 2015/0142940 A1 | 5/2015 | Mcmurry et al. | |
| 2015/0242200 A1* | 8/2015 | Niemoeller | H04L 47/783 |
| | | | 717/172 |
| 2017/0195866 A1* | 7/2017 | Kim | H04L 65/1073 |
| 2018/0287864 A1* | 10/2018 | Hockett | H04L 41/082 |
| 2018/0316620 A1* | 11/2018 | Llorca | H04L 67/10 |
| 2019/0042325 A1* | 2/2019 | Nair | G06F 11/00 |
| 2019/0306045 A1* | 10/2019 | Avdesh Khanna | |
| | | | H04L 41/0686 |
| 2020/0145299 A1* | 5/2020 | Do | H04L 67/10 |

OTHER PUBLICATIONS

"Amazon CloudWatch—Application and Infrastructure Monitoring", retrieved from https://aws.amazon.com/cloudwatch/ on Apr. 5, 2019.

* cited by examiner

SYSTEM AND METHOD FOR PROVIDING INTELLIGENT DIAGNOSTIC SUPPORT FOR CLOUD-BASED INFRASTRUCTURE

PRIORITY AND CROSS-REFERENCE TO RELATED APPLICATION(S)

This nonprovisional application claims priority based upon the following prior United States provisional patent application(s): (i) "CLOUD ECOSYSTEM STATE FOR INTELLIGENT SUPPORT," Application No. 62/756,447, filed Nov. 6, 2018, in the name(s) of Hoang Do and Sergey Odobetskiy; each of which is hereby incorporated by reference in its entirety.

TECHNICAL FIELD

The present disclosure generally relates to diagnostic techniques for communications network infrastructure. More particularly, and not by way of any limitation, the present disclosure is directed to a system and method for providing intelligent diagnostic support for cloud-based infrastructure based on cloud ecosystem states.

BACKGROUND

Widespread proliferation of wireless broadband networks offers increased quality of experience for mobile users, but also renders management and maintenance of such networks a tedious and costly task. The network core, which facilitates mobile management and data transfer is traditionally comprised of individual server elements with each piece of hardware performing a dedicated task. The server elements may require frequent maintenance, and the network connectivity between the elements needs to remain highly reliable and fast. Network and/or element mis-configuration can lead to severe mobile user performance degradation. Also, if demand increases, additional hardware may need to be added to provide additional computing resources.

To address the foregoing concerns, network operators are increasingly exploring technological advances such as cloud computing and scalable virtualized networks. Whereas computing resources and network infrastructure components, e.g., comprising servers, storage, databases, networking connectivity, software, analytics, intelligence, etc., are implemented in a cloud environment, thereby facilitating faster service innovation and deployment, flexible resource allocation, and economies of scale, such implementations are also facing challenges in terms of increased network monitoring, especially in the emerging hybrid network environments. Further, as applications are also becoming ever more complicated and increasingly cloud-based, diagnostics management of cloud-hosted assets, specifically involving resource abstractions such as server virtualization and Software-Defined Networking (SDN), has become more demanding, thereby requiring further innovation as will be set forth hereinbelow

SUMMARY

To determine the operational status of virtual applications and/or underlying virtual as well as physical infrastructure comprising a cloud ecosystem, a series of health check operations (e.g., status verifications) can be performed using various technical means. Each health check activity requires knowledge of certain input/output parameters and/or behavioral patterns to detect an issue caused by software/hardware configuration, physical/virtual connectivity, power, maintenance activities, cloud orchestration processes, networking, data/traffic, etc. Due to the complexity of an example cloud ecosystem, especially one with dependencies between various components, the planning, execution and analysis of results of the health check operations can take an extended period of time, usually requiring highly skilled personnel capable of determining the root cause of the issue and providing recommendations as to appropriate corrective actions.

Certain aspects of the present disclosure and example embodiments herein may provide solutions to these or other challenges. An example embodiment may involve a cloud ecosystem state model that facilitates automated health check, data collection and analytical tools, which not only allow simplification of cloud diagnostics but also provide improved accuracy of results as well as suitable recommendations addressing any existing and/or potential issues, thereby ensuring robustness of a cloud computing environment. Some example embodiments are capable of automatic adaptation to diagnostic data fluctuations caused by maintenance activities, virtual application deployment and lifecycle management changes, cloud orchestration tasks, etc.

In one aspect, an embodiment of the present invention is directed to a cloud infrastructure diagnostics system which comprises, inter alia, a cloud state configuration module operative to define a cloud state model with respect to a cloud infrastructure, wherein the cloud state model comprises a structured collection of select operational characteristics relative to one or more cloud infrastructure components. The cloud state model may include a definition of dependencies between the cloud infrastructure components where applicable. The diagnostics system further comprises a cloud state monitoring module that is operative, responsive to the cloud state model definition, to collect periodic cloud state updates with respect to the cloud infrastructure. A cloud state analysis module of the diagnostics system is operative, responsive to receiving the periodic cloud state updates, to perform: comparing one or more cloud state updates to a corresponding predefined set of reference states; and determining one or more notifications to be transmitted with respect to the operational characteristics of the cloud infrastructure components. Depending on implementation, example cloud infrastructure may comprise at least one of cloud-based communications network infrastructure, cloud-based information technology (IT) infrastructure and cloud-based service/application infrastructure, and the like.

In another aspect, an embodiment of the present invention is directed to a method for providing intelligent support for a cloud-based communications/computing network or application infrastructure. The claimed method comprises, inter alia, configuring a cloud ecosystem state (CES) model with respect to at least a network portion of the cloud infrastructure, e.g., communications/computing network, wherein the CES model is operative to define a cloud ecosystem state having a variable dimensionality based on one or more operational characteristics of the network portion; obtaining diagnostics data corresponding to the cloud ecosystem state from one or more infrastructure elements of the network portion; and analyzing the diagnostics data and providing one or more feedback messages operative to adaptively update the cloud ecosystem state with respect to at least one of the variable dimensionality and operational characteristics of the network portion. In one implementation, the cloud ecosystem state corresponds to a time-stamped record of the diagnostic data, wherein the cloud ecosystem state may include instructions regarding retrieving a diagnostic entity associated with the cloud ecosystem state and performing an evaluation of the diagnostic data of the diagnostic entity. In one variation, the claimed method may comprise obtaining the time-stamped record of the cloud ecosystem state at a particular time and performing a matching analysis against a stored cloud ecosystem state in a reference database. In another variation, the claimed method may comprise performing a matching analysis involving the time-stamped record of the cloud ecosystem state against a pattern of a time-based sequence of the cloud ecosystem state at different times.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, apparatus, system, network element, a data center node or cloud platform, and the like, mutatis mutandis. Further features of the various embodiments are as claimed in the dependent claims.

Advantages of an example embodiment disclosed herein may include, without limitation, one or more of the following: (i) allows execution of automatic diagnostics of enterprise cloud ecosystem including virtual/physical infrastructure, virtual resources and applications, to troubleshoot issues and provide recommendations how to address them; (ii) allows to achieve simplification and acceleration of cloud diagnostics by using cloud state modeling, which provides a structured collection of selected operational characteristics which includes dependencies between various components; (iii) automatic adaptation to the diagnostic data fluctuations caused by maintenance activities, virtual application deployment and lifecycle management changes, cloud orchestration tasks, etc.; (iv) providing predictive analysis using obtained diagnostic data (e.g., prior to fault actually occurs) with the possibility to automatically execute fault prevention activities or provide operator with recommendations how to address potential issues; (v) support of accelerated deployment of new virtual services to customer sites by minimizing gap with a product development test lab (e.g., by comparing ecosystem states between the two (test) environments and/or as between two or more different steps in the deployment process), which may also be applicable to most of maintenance activities; (vi) reduction of human error factor; (vii) configurability to use either proprietary open source components/products to customize as needed per deployment; (viii) configurability for multi-vendor and/or multi-operator deployments having different vendor virtual applications, including hybrid network implementations; and (ix) provisioning reference implementation metrics for facilitating evaluation of key performance indicators (KPIs) in a diagnostics deployment.

Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION

Figure 1:
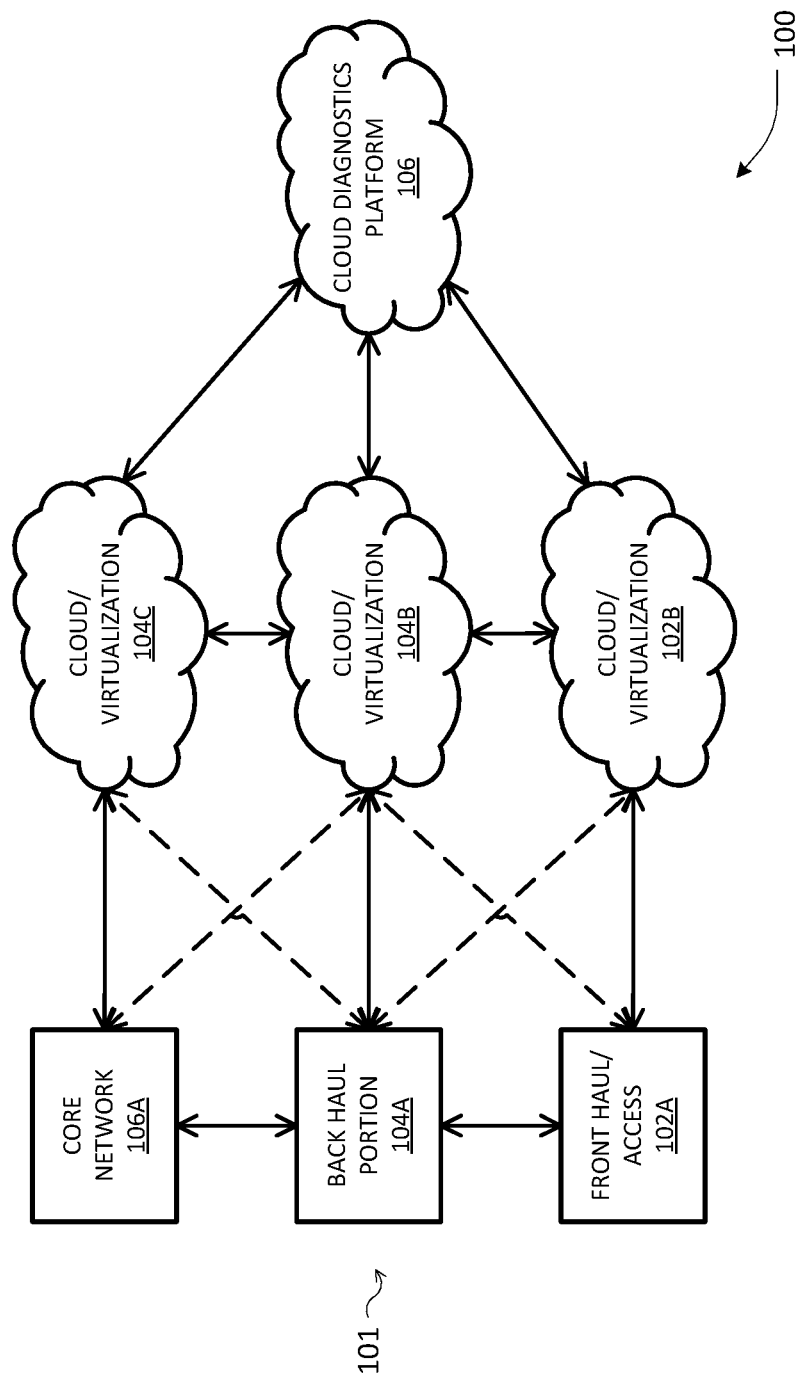
FIG. 1 depicts a generalized example network environment wherein an embodiment of the present invention may be practiced for effectuating cloud infrastructure diagnostics and management with respect to at least a portion of the network environment.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element may be programmed for performing or otherwise structurally arranged to perform that function.

As used herein, a network element, platform or node may be comprised of one or more pieces of network equipment, including hardware and software that communicatively interconnects other equipment on a network (e.g., other network elements, end stations, etc.), and is adapted to host one or more applications or services with respect to a plurality of subscribers and associated client devices as well as other endpoints and Industrial Internet of Things (IIoT)-based and IoT-based entities, each executing suitable client applications configured to consume various data/voice/media services as well as sense/collect various types of data, information, measurements, etc. Some network elements may comprise "multiple services network elements" that provide support for multiple networking functions (e.g., routing, bridging, switching, Layer-2 aggregation, session border control, Quality of Service, and/or subscriber management, and the like), and/or provide support for multiple application services (e.g., data, voice, and video). As such, some network elements may be disposed in a cellular wireless or satellite telecommunications network, or a broadband wireline network, whereas other network elements may be disposed in a public packet-switched network infrastructure (e.g., the Internet or worldwide web, also sometimes referred to as the "cloud"), private packet-switched network infrastructures such as Intranets and enterprise networks, as well as service provider network infrastructures, any of which may span or involve a variety of access networks, backhaul and core networks in a hierarchical arrangement. In still further arrangements, one or more network elements may be disposed in cloud-based platforms or data centers having suitable equipment running virtualized functions or applications, which may be monitored and diagnosed according to one or more example embodiments set forth hereinbelow.

Example end stations and client devices (broadly referred to as User Equipment or UE devices) may comprise any device configured to consume and/or create any service via one or more suitable access networks or edge network arrangements based on a variety of access technologies, standards and protocols, including homogeneous and/or heterogeneous networks comprising split architectures and other infrastructural arrangements, which may also be virtualized and/or cloud-based. Accordingly, example UE devices in an illustrative end-to-end network implementation may comprise smartphones, multimedia/video phones, mobile/wireless user equipment, portable media players, smart wearables such as smart watches, goggles, digital/bionic/haptic gloves or other kinesthetic devices, portable laptops, netbooks, palm tops, tablets, phablets, mobile phones, IIoT/IoT devices and sensors, connected vehicles (manual and/or autonomous), and the like, as well as networked or local gaming devices/consoles including augmented reality (AR), virtual reality (VR) or mixed reality (MR) devices. In a further variation, some client devices or subscriber end stations may also access or consume content/services provided on virtual private networks (VPNs) overlaid on (e.g., tunneled through) the Internet. Typically, in some example arrangement, UE devices and end stations may be coupled (e.g., through customer/tenant premise equipment or CPE/TPE coupled to an access network (wired or wirelessly)) via edge network elements, which are coupled (e.g., through one or more core network elements) to other edge network elements, and to cloud-based data center elements with respect to consuming hosted resources/services according to service management agreements, access level privileges, authorization/authentication protocols, etc.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is a generalized example network environment 100 wherein an embodiment of the present invention may be practiced for effectuating cloud infrastructure diagnostics and management with respect to at least a portion of the network environment. A hierarchical network arrangement 101 may be comprised of a fronthaul radio access network (RAN) portion or layer 102A, a backhaul portion or layer 104A and a core network portion or layer 106A, each of which may in turn include appropriate infrastructure elements, components, etc., cooperatively configured for effectuating the overall network functionality. By way of illustration, an embodiment of the fronthaul portion 102A may be based on a split RAN network architecture in one example implementation, e.g., in a Coordinated-RAN or Centralized-RAN (C-RAN) architecture (also referred to as Collaborative RAN), wherein a plurality of macrocells, microcells, small cells, femtocells, picocells, etc. (which may be collectively referred to as "cells" unless otherwise specified, served by respective remote radio units (RRUs) or remote radio heads (RRHs), or micro RRUs) may be coupled to one or more baseband units (BBUs) via a suitable transport network. In one arrangement, the BBUs may be organized into one or more BBU pools or hubs operative to serve various cells (i.e., via respective RRUs, mRRUs and the like) connected by means of respective in-phase, quadrature (I/Q) data communication links that may span several kilometers, each operating based on a suitable protocol such as, e.g., Common Public Radio Interface (CPRI), Open Base Station Architecture Initiative (OBSAI), or Open Radio equipment Interface (ORI) over optical fiber or microwave media. In general, a BBU may be configured to serve one or more cells depending on cell allocation. In some embodiments, a low latency link may be disposed between the BBU hubs of the network environment 100 for facilitating inter-hub communication and coordination. Backhaul network portion 104A may be configured to operate as an aggregation network for connecting such BBU pools to suitable entities in the core network portion 106A, which may be based on a converged communications architecture, e.g., an Evolved Packet Core (EPC) architecture, that typically includes various components and elements such as one or more mobility management entities (MMEs), serving gateways (SGWs), packet data node (PDN) gateways (PGWs), policy/charging function nodes, etc., as is known in the art.

Skilled artisans will recognize that a number of various implementations of the hierarchical network environment 101A are also possible depending on different access technologies, protocols, deployment scenarios, inter-operator service level agreements (SLAs), and the like. In general, accordingly, at least some aspects of the hierarchical network arrangement 101A may comprise one or more of the following access network infrastructural elements including but not limited to: Global System for Mobile Communications (GSM) radio access network (GRAN) technology, Enhanced Data Rates for Global System for Mobile Communications (GSM) Evolution (EDGE) network (GERAN) technology, $3^{rd}/4^{th}/5^{th}$ Generation Partnership Project (3/4/5 Gen) network technology, Integrated Digital Enhanced Network (IDEN) technology, WiMAX technology, various flavors of Code Division Multiple Access (CDMA) network technology, heterogeneous access network technology, Universal Mobile Telecommunications System (UMTS) network technology, Universal Terrestrial Radio Access Network (UTRAN) technology, All-IP Next Generation Network (NGN) technology, and Long Term Evolution (LTE) technology, etc., as well as various flavors of short-range radio access technologies such as, e.g., WiFi, and the like.

Given the broad array of architectural implementations, example cell site infrastructures may comprise traditional all-in-one macro base stations (BSs) coupled to antennas, base station subsystems (BSSs) including base transceiver stations (BTSs) associated with one or more base station controllers (BSCs), distributed base stations with remote radio heads (RRHs) or radio units (RUs) separated from baseband units (BBUs) by fiber, cloud or centralized RAN (C-RAN) infrastructures as well as virtualized RAN (V-RAN) infrastructures and RAN infrastructures for supporting heterogeneous networks, as noted elsewhere in the present patent disclosure. In general, edge node infrastructure elements or components may therefore include without limitation, gNB nodes, eNodeB nodes, base stations, wireless access points (e.g., a Wi-Fi access point), low-power nodes, BTSs/BSCs, relays, donor node controlling relays, transmission points, transmission nodes, RRUs/RRHs, multi-standard radio (MSR) radio nodes such as MSR BS, nodes in distributed antenna system (DAS), Self-Organizing Network (SON) nodes, positioning nodes (e.g., E-SMLC or Evolved Serving Mobile Location Center), or any other suitable network node. As noted above, example edge nodes may be deployed throughout a network (e.g., in a fronthaul network portion) as a homogenous deployment, heterogeneous deployment, or mixed deployment. For example, a homogeneous deployment may generally describe a deployment comprising the same (or similar) type of edge nodes and/or similar coverage and cell sizes and inter-site distances. A heterogeneous deployment may generally describe deployments using a variety of types of edge nodes having different cell sizes, transmit powers, capacities, and inter-site distances. For example, a heterogeneous deployment may include a plurality of low-power nodes, e.g., microcells, small cells, femtocells, picocells, etc., as noted previously, which may be placed within and/or across a macro-cell layout. Mixed deployments may include a mix of homogenous portions and heterogeneous portions.

In further arrangements, an example implementation of the network environment 100 may also involve terrestrial and/or satellite broadband delivery infrastructures, e.g., a Digital Subscriber Line (DSL) network infrastructure, a Data Over Cable Service Interface Specification (DOCSIS)-compliant Cable Modem Termination System (CMTS) infrastructure, switched digital video (SDV) network infrastructure, a Hybrid Fiber-Coaxial (HFC) network infrastructure, a suitable satellite access network infrastructure, etc., in addition to example broadband wireless network architectures involving long-range (e.g., cellular) and/or short-range (e.g., WiFi) infrastructures as set forth above.

Regardless of how an example embodiment of the hierarchical network arrangement 101 is configured, any portion or portions thereof may be virtualized and/or implemented in a cloud-based arrangement wherein various infrastructure components may be provided as one or more virtual machines or functions based on suitable virtualization abstraction schemes and architectures. By way of illustration, the fronthaul/access network portion 102A may be implemented as a cloud/virtual layer 102B that may be representative of a cloud RAN or VRAN arrangement wherein various edge infrastructure elements noted above may be virtualized. Likewise, the backhaul network and core network portions 104A/106A may also be virtualized and/or cloud-implemented, as exemplified by corresponding cloud/virtual layers 104B and 106B, respectively. For instance, one or more MME virtual machines (VMs), PDN gateway VMs, home subscriber server (HSS) VMs, policy and charging rule function (PCRF) VMs, SGW VMs, etc., may be provided as virtualized infrastructure elements in the corresponding cloud implementations, wherein the standard interfaces among such entities may be replicated as suitable Software-Defined Network (SDN) Software-Defined Infrastructure (SDI) interfaces in the cloud computing environment.

Depending on which aspects or functional layers of the hierarchical network arrangement 101 are virtualized and cloud-implemented, a variety of deployment scenarios are possible wherein different combinations of physical and/or virtualized infrastructure components of the network environment 100 may be treated as a communications network ecosystem that may be monitored and diagnosed according to the teachings of the present invention. By way of illustration, an example ecosystem may be representative of a deployment scenario where all the layers of the hierarchical network arrangement 101A are virtualized, e.g., in an all-cloud implementation. In another deployment scenario, only the core network portion 106A is implemented in the cloud. Regardless of the degree of virtualization and cloud-centric implementation of the hierarchical network arrangement 101A, a cloud-based diagnostics platform 106 having suitable interfaces with respect to the applicable physical and/or virtual infrastructure components of an ecosystem may be provided based on a scalable and configurable cloud ecosystem model as will be set forth in detail further below.

Figure 2:
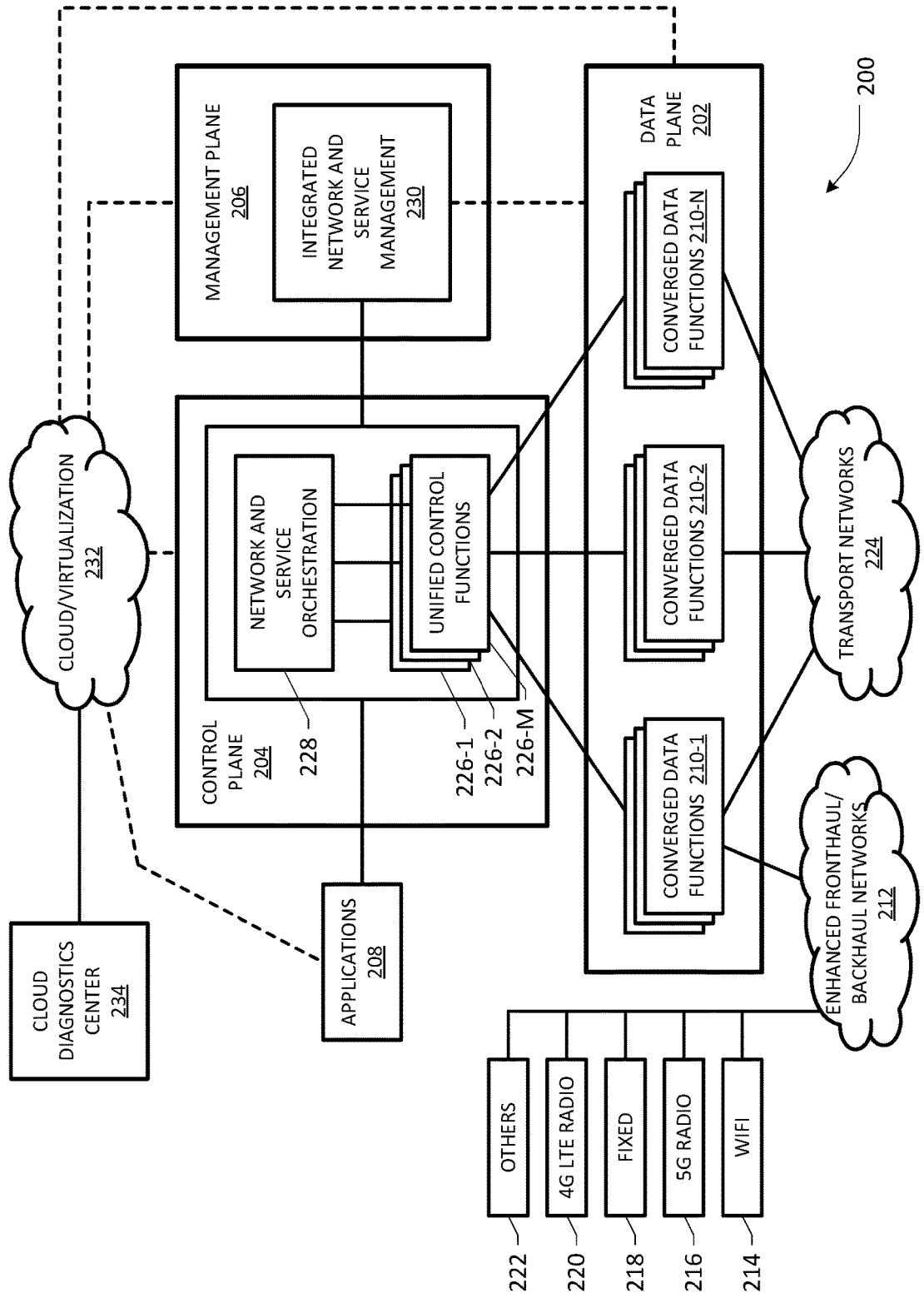
FIG. 2 depicts another view of an example network environment having a hierarchical architecture with multiple radio access technology (RAT) infrastructures and transport network portions wherein a cloud diagnostics system may be employed with respect to different aspects of a data plane, a control plane and a management plane according to an embodiment of the present invention.

It will be realized that it is also useful to visualize an example ecosystem of a network environment in terms of an architecture compartmentalized into a data plane, a control plane and a management plane, at least for purposes of some embodiments of the present patent disclosure. Turning attention to FIG. 2, depicted therein is an example network environment 200 having a compartmentalized architecture with multiple access technology infrastructures and transport network portions, wherein a data plane 202, a control plane 204 and/or a management plane 206 may be virtualized in a cloud arrangement that may be treated as an ecosystem in accordance with an embodiment of the present patent disclosure. In general, the data plane 202 (also referred to as user plane, bearer plane, or forwarding plane) is operative to carry the network's user data traffic (i.e., the actual payload), whereas the control plane 204 is operative to carry control information (also known as signaling). The management plane 206 is operative to carry the operations and administration traffic required for network management, which sometimes may be integrated with the control plane functionality. As illustrated, the data plane 202 may comprise one or more converged data functions 210-1 to 210-N that are communicatively coupled to one or more enhanced fronthaul/backhaul networks 212 and/or one or more transport networks 224. Example access technologies may include 4G LTE 220, Fixed Wireless/Wireline 218, 5G 216, WiFi 214 as well as other known or yet to be developed technologies 222. One or more unified control functions 226-1 to 226-M may be provided as part of the control plane 204, which may be coordinated by one or more network and service orchestration entities 228. One or more integrated network and service management functionalities 230 may comprise the management plane 206 having suitable interfaces to the entities in the control plane 204 as well as the data plane 202. In some arrangements, the management as well as network control functionalities may also be configured or otherwise integrated as management nodes such as, e.g., network operations center (NOC) elements, Operations Support Systems (OSS) and/or Business Support Systems (BSS) (together often abbreviated as O/BSS or B/OSS), and the like (not specifically shown in this FIG.). A plurality of applications and services 208 may be instantiated, provisioned, deployed, managed and/or supported by or in the network environment 200. Similar to the arrangement shown in FIG. 1, one or more compartmentalized aspects of the network environment 200 may be implemented using a cloud-centric virtualization platform 232, which may be treated as a cloud ecosystem that is representative of the network environment 200. Further, a cloud diagnostics center or system 234 may be associated with the cloud ecosystem 232 for providing intelligent diagnostics support and management regardless of the dynamically variable nature of the underlying network environment 200.

Although not specifically shown in FIG. 2, the network environment 200 may also be implemented in a sliced network architecture having a slice policy control functionality, which may be referred to as a Control, Orchestration, Management, Policy, and Analytics (COMPA) entity, wherein the cloud ecosystem 232 may be suitably configured to include such architectural variations as well as any additional control entities. Broadly, COMPA is derived from performing the key tasks of Control, Orchestration, Management, Policy, and Analytics with respect to a network slice or slices instantiated on a shared/private network infrastructure, which may be configured to provide a modular framework as well as an architecture for a federation of control units exhibiting a common underlying control signaling loop pattern. In one arrangement, COMPA may be configured to operate at different levels in a carrier network. At any given layer, it orchestrates and manages the layer's resources to deliver services. Such resources may in turn contribute to the services exposed by the receiving layer. Accordingly, a recursive pattern with multiple, nested levels of control may be implemented in a sliced network architecture configured to support various applications and services 208. In one embodiment, the following underlying building blocks of COMPA may be provided: Control/Orchestration/Management (COM) executing control decisions; Policy (P) responsible for intelligence and dynamic governance to achieve control decisions; and Analytics (A) providing real time insights to influence control decisions. The COMPA architecture may be configured to define a number of sample federated domain layers (also referred to as responsibility domains) with specific functionalities such as, e.g.: "Customer/Tenant" (service and cloud user), "Network Functions" (RAN, fixed access, etc.), "Cloud Infrastructure" (Data Centers), and "Transport Networks" (e.g., Access, Metro, Edge, Core, etc.). Such operational layers may be supported by one or more cross-cutting "Multi-Layer Federation" and "Business" layers for continuous operations across the federated domain layers, e.g., to support multi-vendor, multi-operator, and/or multi-technology deployments. Accordingly, it will be appreciated that example cloud ecosystems for purposes of the present patent disclosure may comprise a variety of configurations, layers, and constituent components, generally reflecting the myriad of network deployments currently in place or yet to be developed.

Figure 3A:
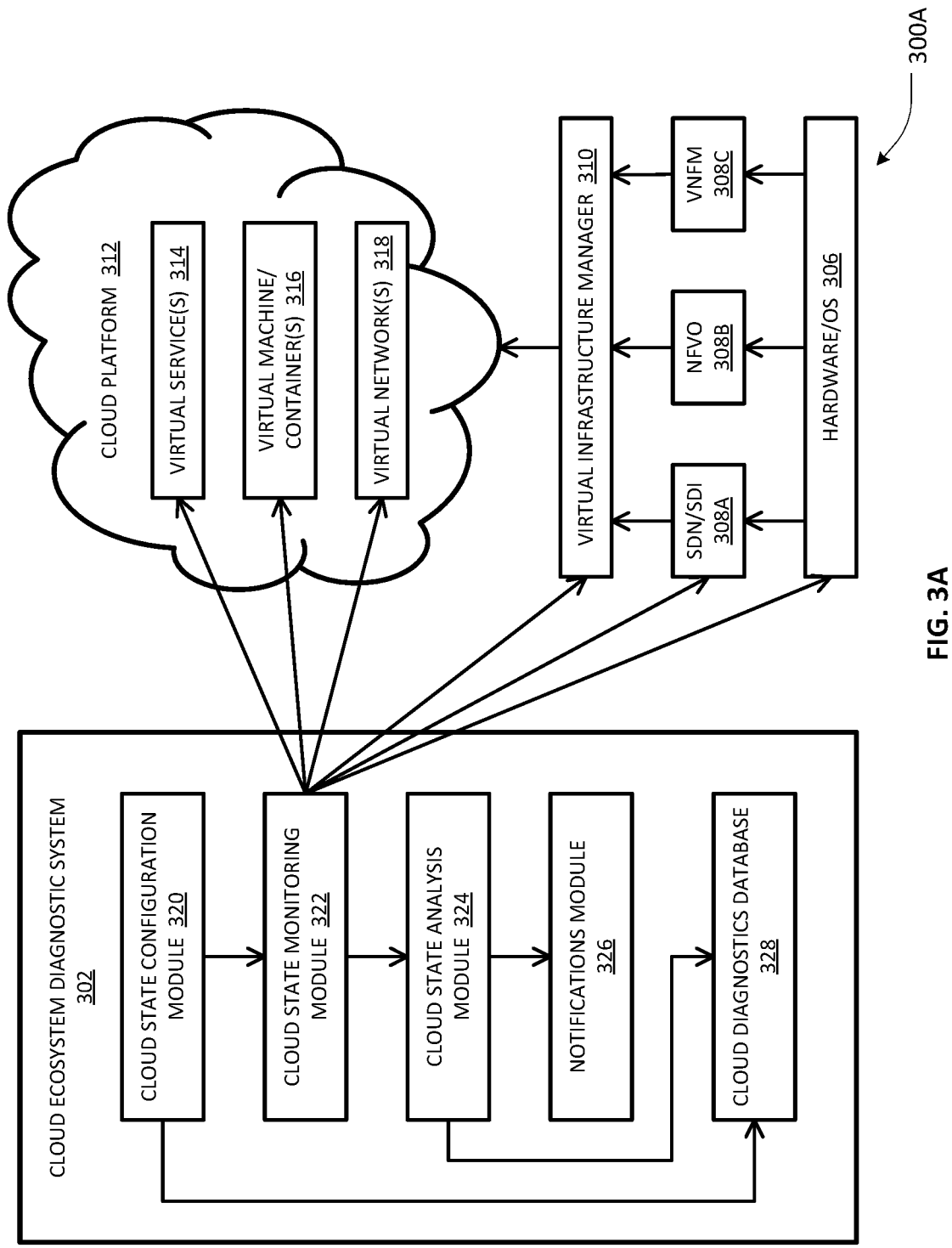
FIG. 3A depicts a block diagram of an example cloud ecosystem diagnostics system according to an embodiment of the present invention.

FIG. 3A depicts a block diagram of an example cloud ecosystem diagnostics system or platform provided with respect to a cloud ecosystem 300A (which may also be referred to as cloud computing infrastructure of a network portion) according to an embodiment of the present invention. Example infrastructure of a network portion may comprise various compute/storage/network connectivity resources as well as software resources, generally shown as hardware/Operating System (OS) resources 306, which may be virtualized using technologies such as, e.g., SDI/SDN 308A, NFV Orchestration 308B and Virtual Network Function Management (VNFM) 308C, which are managed by a Virtual Infrastructure Manager (VIM) 310. A corresponding cloud-centric implementation 312 therefore may include one or more virtual networks 318, one or more virtual machines and/or containers 316 and one or more virtual applications/services 314. In at least some embodiments, a cloud ecosystem diagnostics system 302 may be configured as a computer-implemented apparatus associated with the cloud ecosystem 300A or separately as a third-party service platform for monitoring and/or detecting operational status of the cloud ecosystem 300A including virtual applications/services (e.g., comprised of interconnected cloud resources such as virtual machines, virtual networks, virtual storage, etc.), operating environment (e.g., application servers, containers, operating systems, etc.), virtual infrastructure (e.g., virtual management platform), physical infrastructure (e.g., hardware, networking/connectivity/ports, power, etc.) as well as data traffic flows. A Cloud State (CS) Configuration or Cloud Ecosystem State (CES) Configuration module 320 provided as part of the diagnostics system 302 preferably allows a human operator, network manager or an expert system to define a cloud state model (also referred to as a cloud ecosystem state model), for example, by discretizing, quantizing or otherwise parameterizing certain operational characteristics with respect to the physical/virtual infrastructure elements, components and functionalities comprehended within the cloud ecosystem 300A. In some embodiments, a definition of a cloud ecosystem state model may comprise a structured collection of selected operational characteristics used for monitoring by a Cloud State Monitoring or Cloud Ecosystem State Monitoring module 322. According to some embodiments, example operational characteristics may include but not limited to following: diagnostic attributes obtained from predefined application programming interfaces or APIs, system utilities, custom scripts, log files entries, etc., along with expected threshold values, limits, set points, patterns or ranges, etc. Preferably, the cloud ecosystem state model may be configured to include dependencies between various components, which show interrelationships among the components and entities so as to facilitate tracking, identification and assignment of causes (e.g., deterministic and/or probabilistic causation, involving root causes, primary causes, secondary or contributory causes, etc.) with respect to a particular issue, problem or variance of an operational characteristic or attribute of the cloud ecosystem. In one embodiment, a Cloud Diagnostics Database module 328 may be provided as part of the diagnostics platform 302 that is operative to store the cloud ecosystem state model, which may be accessed, analyzed, updated and/or otherwise reconfigured by other components as will be set forth hereinbelow.

In one example implementation, a cloud ecosystem state model may be defined as a collection of related diagnostic entities along with required diagnostic actions, and may be comprised of a variable-length list or nested hierarchy of diagnostic definitions where each diagnostic definition can be expressed by a structure such as but not necessarily identical to following: (i) Diagnostic Entity name/ID (Unique Identifier); (ii) Diagnostic Endpoint (device, interface, API location, etc.) for health check execution; (iii) Diagnostic Endpoint Access details, for example IP address, user name, password, etc.; (iv) Heath Check Command (for example script name/location) to execute; and (v) List of related sub-definitions where each sub-definition has the same format as parent definition, among others.

In one example implementation, a cloud state (CS) or a cloud ecosystem state (CES) comprises a collection or assembly (e.g., lists, nested or hierarchical data, etc.) of diagnostic results obtained at a certain time slice (e.g., timestamp) according to a predefined cloud ecosystem state model, stored in the Cloud Diagnostics Database module 328 with the corresponding timestamp, which may be referred to as a CS or CES record. As will be set forth below, such CES records may be made available for comparison and analysis with other state(s) obtained at different timestamp(s), e.g., time-series analysis, etc., to determine, predict, estimate, or otherwise obtain diagnostic status of the cloud ecosystem under monitoring and provide troubleshooting steps, solutions, notifications, management updates, and the like. It will be appreciated that a cloud ecosystem state can be treated as a multi-dimensional canonical data object or entity that can take on different sets of values at different instances of time, thereby giving rise to a plurality of a set of time-variant "states" corresponding to the CES object depending on the definition provided by the CES model. Further, such cloud ecosystem states can be compared in single environment (e.g., intra-ecosystem analysis) or between different environments (e.g., inter-ecosystem analysis) as long as they match the same CES model or as soon as they match the model (e.g., model convergence at a particular instance of time).

In one example implementation, a CES record can contain following information, without limitation: (i) Cloud State Model name/ID (reference to an existing model); (ii) Diagnostic Entity name/ID (reference to an existing element in the cloud state model); (iii) Timestamp; (iv) Heath Check Command output: raw and/or formatted data returned as result of the diagnostic execution; (v) Heath Check Status with values similar but not necessarily identical to: NULL (initial status before health check execution), WARN, SUCCESS, FAILURE as result of execution Parent state status may be calculated as aggregate result of sub-states.

By way of illustration, set forth below is an example of a CES record at a particular timestamp $\{CES(T_0)\}$ with respect to a 5G cloud ecosystem (e.g., at 08/30/2099 20:30:00 GMT):

```
{
"state_model_name" : "5G_solution_cloud_state_model",
"diagnostic_entity_name" : "SiteA_5G_solution_cloud",
"timestamp" : "08/30/2099 20:30:00 GMT",
"status" : "SUCCESS",
"sub_state" :
[
    {
    "diagnostic_entity_name" : "ecm_coreVM",
    "timestamp" : "08/30/2099 20:30:00 GMT",
    "health_check_command_output" : "true",
    "status" : "SUCCESS"
    }
    ....
]
}
```

Following is an example of the CES record at a different timestamp $\{CES(T_1)\}$ (e.g., 08/30/2099 20:30:10 GMT, which is 10 seconds after $\{CES(T_0)\}$) for the 5G cloud ecosystem:

```
{
"state_model_name" : "5G_solution_cloud_state_model",
"diagnostic_entity_name" : "SiteA_5G_solution_cloud",
"timestamp" : "08/30/2099 20:30:10 GMT",
"status" : "WARN",
"sub_state" :
[
    {
```

-continued

```
        "diagnostic_entity_name" : "ecm_coreVM ",
            "timestamp" : "08/30/2099 20:30:10 GMT",
            "health_check_command_output" : "20:30:10,082 WARN
[stdout] (HeartBeat) com.conceptwave.system.CwfException: OE2000:
Unexpected exception {0} in API {1}",
            "status" : "WARN"
        }
        ....
    ]
}
```

A Cloud State Monitoring or Cloud Ecosystem State Monitoring module 322 is provided as part of the diagnostics system 302 for monitoring various physical/virtual infrastructure elements, components and functionalities (e.g., at different times, either periodically, randomly, automatically, operator-triggered, system-triggered or event-driven, and the like, or any combination thereof). Such monitoring may take place at different levels of the cloud ecosystem 300A, e.g., including the underlying hardware/OS infrastructure 306 in some implementations. Further, not all components or elements need to be monitored all the time or at the same time. As such, a variety of monitoring schedules involving different components/elements may be configured for an example cloud ecosystem depending on operator and/or diagnostics system requirements. In one example embodiment, cloud ecosystem states are periodically retrieved and stored using the Cloud Ecosystem Monitoring module 322, wherein the monitoring frequency can be adjusted according to the network environment. Accordingly, a cloud ecosystem state may be treated as a time-variant data object having a variable dimensionality as noted above, wherein different variables or components can be populated with data values obtained at different times as a result of certain diagnostic actions executed using and/or in accordance with the CES model. In one implementation, the cloud ecosystem state may also include intra- and inter-component dependencies and relationships, depending on the operational characteristics being monitored as noted previously. In a further variation, the cloud ecosystem state may also include instructions as to how to retrieve and evaluate each parameter pertaining to the operational characteristics of the cloud ecosystem infrastructure. For example, each element of the CES model forming a portion of the cloud ecosystem state may contain health check operation(s) with preconfigured parameters and output (expected/predicted). It will be realized that such health check operations can produce raw data output, which can be analyzed using various mathematical and statistical techniques, machine learning, pattern recognition, Big Data analytics, etc., by a Cloud Ecosystem State Analysis module 324 as will be set forth further below. In one implementation, each cloud ecosystem state record may be created and stored individually using a current timestamp, wherein a "delta" calculation may be executed by the Cloud Ecosystem State Analysis module 324 by loading/retrieving a sequence of cloud state records over a predefined period of time. For example, cloud ecosystem state changes can be analyzed by suitable time-series analysis techniques, wherein one possible option may be using a known state $\{S1\}$ for the cloud ecosystem state as a baseline and comparing states $\{S2\}$, $\{S3\}$, etc. to $\{S1\}$, i.e., a known/reference state. It should therefore be understood that for purposes of some embodiments of the present patent disclosure, each "state" is a time-stamped record of the CES defined according to the CES model, which is a multi-dimensional data object defined in a multi-dimensional space having potentially interdependent variables/parameters as coordinates. Yet another variation may involve applying techniques such as pattern recognition, expert systems, etc. on the time-series sequence of the CES (e.g., $\{S1\}$, $\{S2\}$, $\{S3\}$, ...) as noted above in order to determine, predict or otherwise obtain a quantitative/qualitative indication of the cloud ecosystem behavior. As one skilled in the art will recognize, such techniques can advantageously allow and facilitate matching of both normal operational conditions as well as maintenance states of an example cloud ecosystem. Further, known states can also be stored in a corresponding knowledgebase repository (e.g., as part of the diagnostics database 328) for future troubleshooting and predictive analysis.

Based on the foregoing, it should be appreciated that an arrangement of the Cloud Ecosystem State Monitoring module 322 of the diagnostics system 302 may be configured to use the CES model definition to collect time-based cloud ecosystem state updates in a dynamic manner (e.g., periodically) from any portion of the virtual/physical infrastructure components, including but not limited to virtual services/applications 314, application servers and/or containers 316, virtual networks 318, virtual management platform(s) 310, hardware/OS connectivity/networking 306, etc., which may be transmitted to and received by the Cloud Ecosystem State Analysis module 324 for purposes of at least some embodiments of the present patent disclosure. Consistent with the operations set forth above, the functionality of the Cloud Ecosystem State Analysis module 324 may therefore, upon receipt of the cloud state updates from the Cloud Ecosystem State Monitoring module 322, is operative to store them in the diagnostics database 328 with current/contemporaneous timestamps. Further, the functionality of the Cloud Ecosystem State Analysis module 324 may also involve comparing the received cloud state updates with previously stored cloud states using associated CES model with predefined patterns to automatically determine cloud system operational status, as noted previously. In one implementation, once the Cloud Ecosystem State Analysis module 324 determines a match for current cloud state update or recognizes a pattern in the state changes, one or more notifications or other management reports may be triggered via a Notifications module 326 to notify external subscribers, observers, listeners or management entities about current cloud ecosystem status as well as recommended solutions and/or to execute automatic fault prevention activities. In a further variation, the Cloud Ecosystem State Analysis module 324 may be configured to store suitable troubleshooting steps and/or solutions regarding how to address any existing issues or prevent possible issues in the future, which may be effectuated in conjunction with the knowledgebase records in the diagnostics database 328. In a still further variation, the Cloud Ecosystem State Analysis module 324 may be configured to update the diagnostics database 328 with new cloud ecosystem state models as well as corresponding cloud ecosystem states and definitions, as well as extend or populate new patterns to accommodate various future use case scenarios involving the cloud ecosystem 300A and/or any network infrastructure updates. In another arrangement, an example embodiment of the cloud ecosystem diagnostics system 302 may involve parallel execution in the Cloud State Monitoring module 322 when and/or where several Cloud State Models are processed simultaneously (which may or may not overlap in the cloud components coverage), e.g., as multiple parallel threads, to achieve more granular diagnostics and allow the option of executing more advanced correlation analysis in the Cloud State Analysis module 324.

Figure 3B:
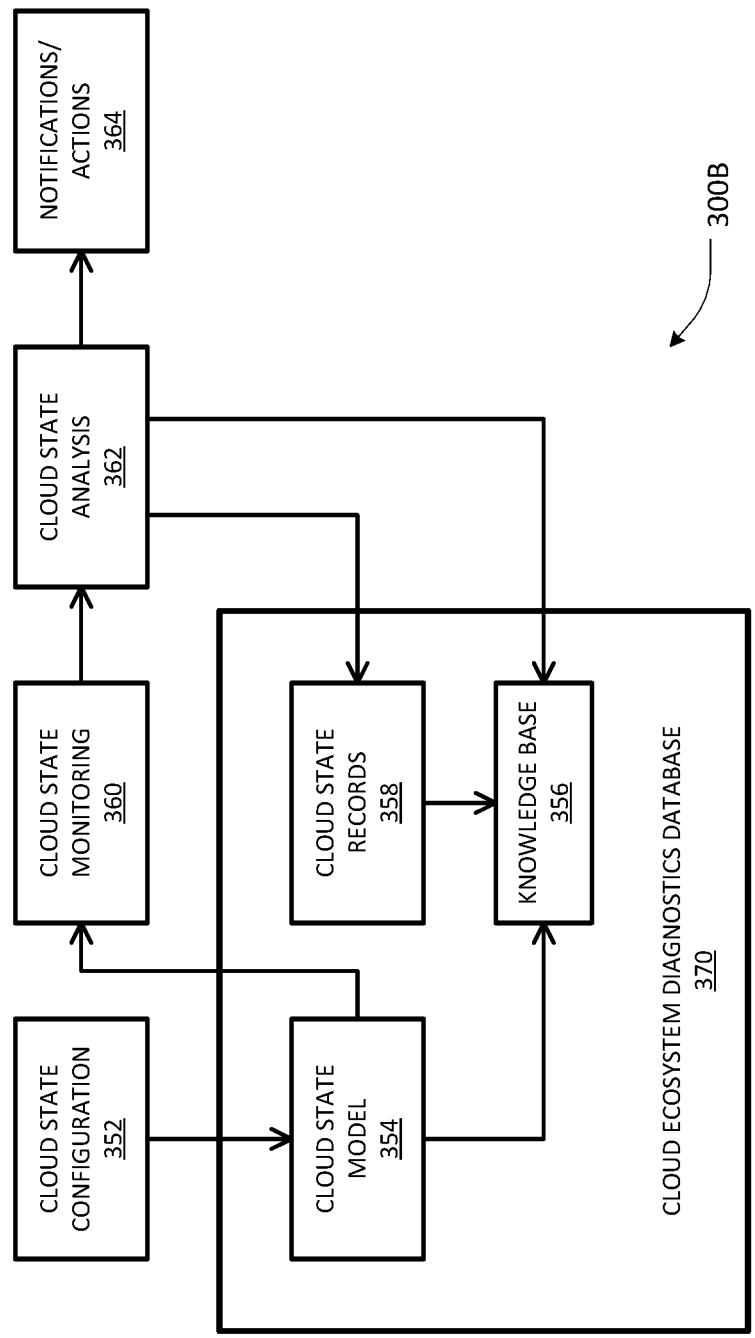
FIG. 3B depicts a functional process flow diagram relative to an example cloud ecosystem diagnostics system according to an embodiment of the present invention.

FIG. 3B depicts a functional process flow diagram 300B relative to the example cloud ecosystem diagnostics system 302 set forth above in accordance with some embodiments of the present patent disclosure, where it will be realized that the terms "cloud state" (or "CS") and "cloud ecosystem state" (or "CES") are generally treated as equivalent terms in the context of the teachings herein unless otherwise specifically noted. At block 352, a cloud ecosystem state configuration process may be executed to define and describe a cloud ecosystem state model 354 with respect to a particular network deployment, which may be stored in a database 370 as part of domain knowledgebase 356. A cloud ecosystem state monitoring process 360 may be executed in accordance with the cloud ecosystem model 354 to obtain a time-stamped record at a particular instance of time and/or a series of time-variant records at different times over a time window. Responsive thereto, a cloud ecosystem analysis 362 may be executed for providing appropriate notifications and actions 364 as well as updates to the cloud ecosystem state records 358 and knowledgebase repository 356 of the cloud ecosystem diagnostics database 370. One skilled in the art will recognize that database 370 and/or knowledgebase repository 356 may be initialized and/or preconfigured with test datasets obtained in trials, field tests, simulations or based on machine learning via expert systems as applied to an example cloud ecosystem or associated network deployment.

Figure 4A:
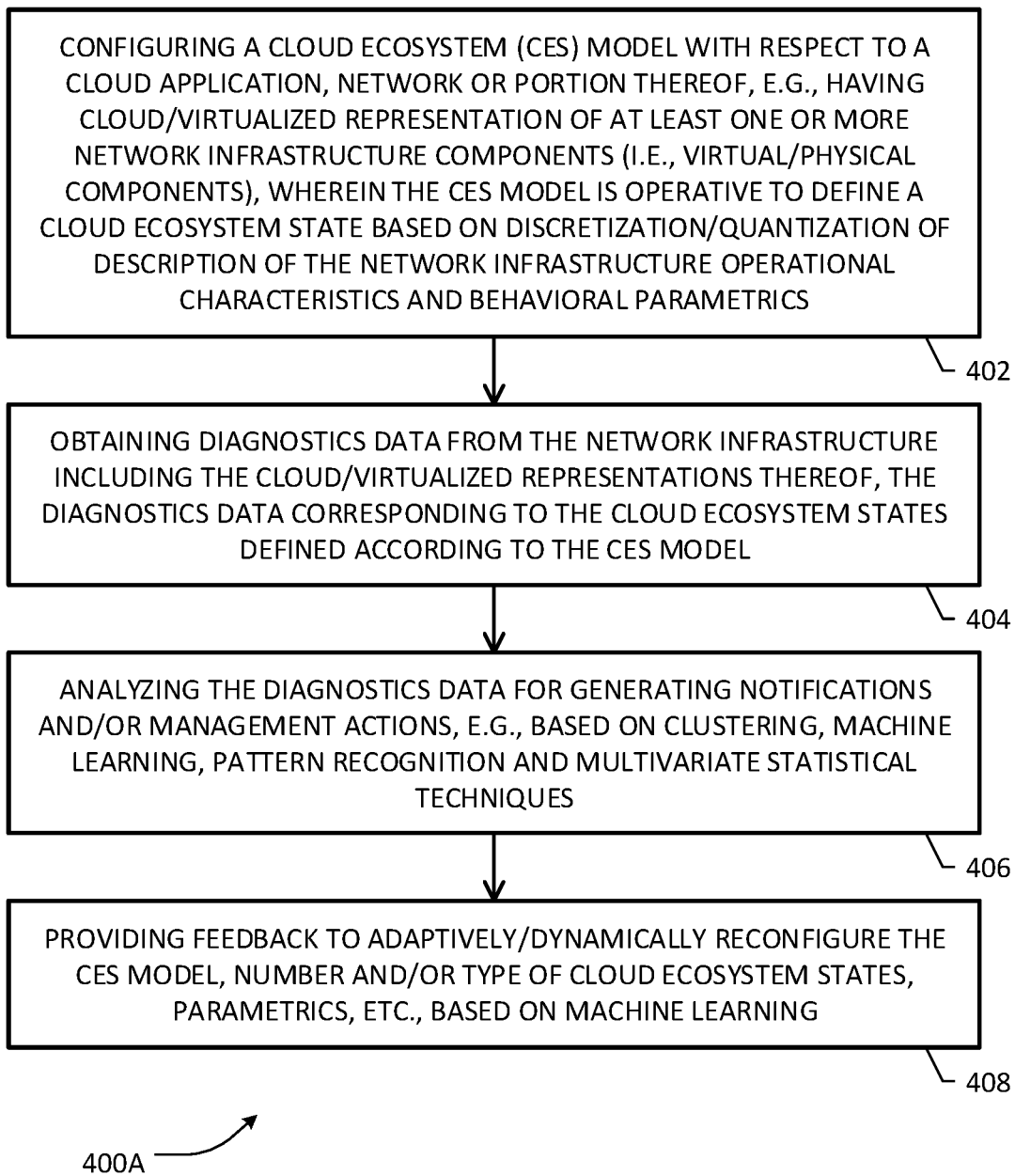
FIGS. 4A-4C are flowcharts illustrative of various blocks, steps and/or acts that may be (re)combined in one or more arrangements, with or without blocks, steps and/or acts of additional flowcharts of the present disclosure, for effectuating an example diagnostics and support management scheme according to one or more embodiments.
Figure 4B:
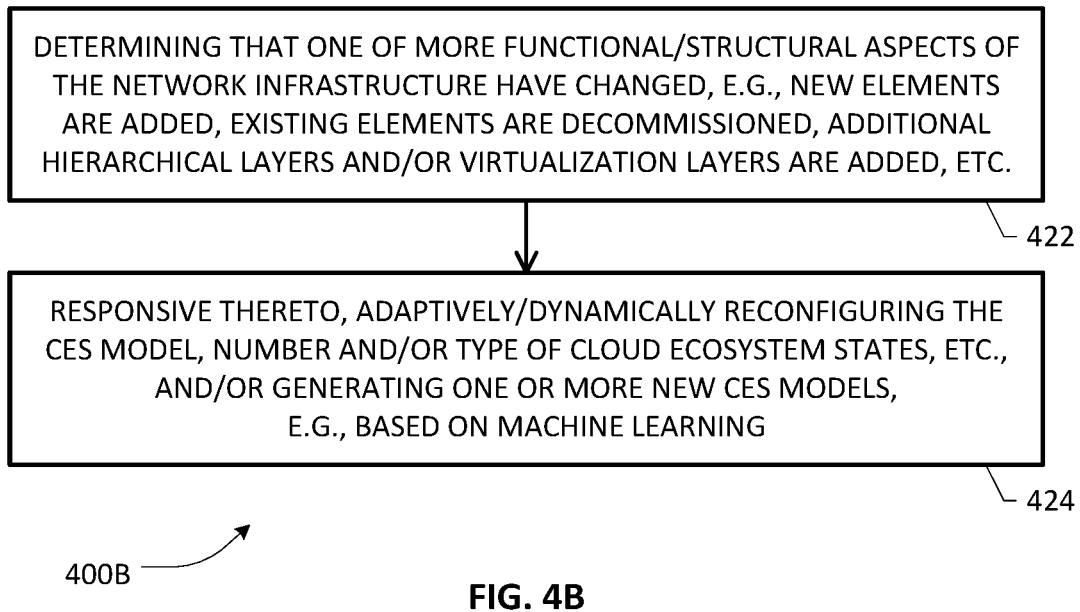
Figure 4C:
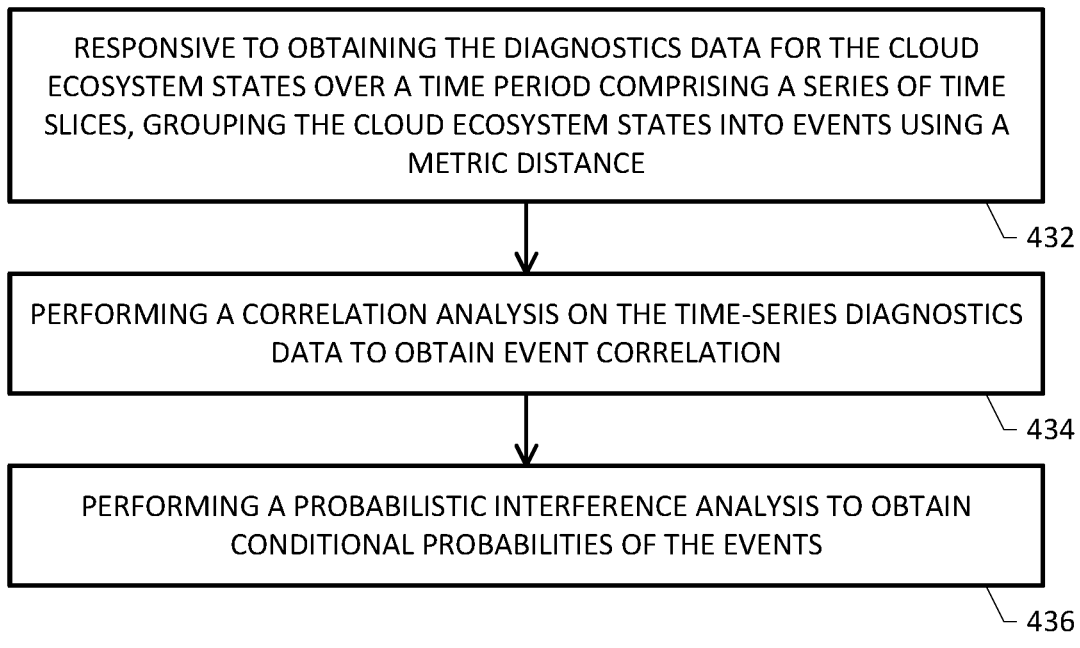

FIGS. 4A-4C are flowcharts illustrative of various blocks, steps and/or acts that may be (re)combined in one or more arrangements, with or without blocks, steps and/or acts of additional flowcharts of the present disclosure, for effectuating an example cloud diagnostics and support management scheme according to one or more embodiments consistent with the foregoing description. Example process 400A commences with configuring a cloud ecosystem state (CES) model with respect to a cloud application, network or portion thereof as set forth at block 402, e.g., having a cloud/virtualized implementation of at least one or more network/service application infrastructure components (i.e., virtual/physical components), wherein the network or its portion may be arranged in any number of configurations and architectures as previously noted. Preferably, the CES model is operative to define a suitable cloud ecosystem state object based on discretization/quantization of a configurable selection of the network infrastructure operational characteristics and behavioral parametrics, e.g., having a variable and/or scalable dimensionality, wherein some of the parameters may be interdependent, both temporally (e.g., time dependence) or otherwise (e.g., structural dependence). At block 404, diagnostics data may be obtained from the cloud ecosystem corresponding to the network infrastructure including the cloud/virtualized representations thereof, wherein the diagnostics data corresponds to the cloud ecosystem state parametrics/variables defined according to the CES model. At block 406, the diagnostics data may be analyzed in a number of ways for generating notifications and/or management actions, e.g., based on clustering, machine learning, pattern recognition and multivariate statistical techniques. At block 408, appropriate feedback signals and actions may be generated, which may be mediated by human operators/experts, expert systems such as automated intelligent entities, and the like, for adaptively/dynamically reconfiguring the CES model, number and/or type of cloud ecosystem state parametrics/variables, etc., based on machine learning, for example.

Example process 400B shown in FIG. 4B may be configured to commence upon determining that one or more functional/structural aspects of the network/application infrastructure have changed, e.g., new elements are added, existing elements are decommissioned, additional hierarchical layers and/or virtualization layers are added, etc., as set forth at block 422. Responsive thereto, the CES model may be adaptively/dynamically reconfigured, which may involve defining a new/updated cloud ecosystem state, wherein a different/updated set of the network infrastructure operational characteristics are parameterized. Similar to the updating processes set forth above, appropriate machine learning modules may also be implemented for reconfiguring the CES model in this process. In a further arrangement, one or more new CES models may be generated for the updated infrastructure. It will therefore be realized that in one example implementation, an additional/alternative option involves creating new models or new versions of the CES model (e.g., {M1, M2, M3, . . . }), instead of dynamically changing {M}. Potential benefits in this approach may be as follows. For example, if other/updated environments are such that where not all infrastructure changes are implemented yet and previous version(s) of the model are still applicable, an updated CES configuration process can still benefit from cloud states and/or knowledgebase records collected for the legacy model(s). In such a "model versioning" or "updating" process, a base CES diagnostics system may be applied across different environments with shared CS/knowledgebase records. These foregoing steps/operations are comprehended in block 424 of process flow 400B.

Example process 400C shown in FIG. 4C is illustrative of an analysis process with respect to a series of cloud ecosystem diagnostics data. At block 432, responsive to obtaining the diagnostics data corresponding to a cloud ecosystem state over a time period, e.g., comprising a series of time slices, the cloud ecosystem state data (i.e., time-specific states) may be grouped into events using a suitable metric distance. At block 434, a correlation analysis may be performed on the grouped time-series diagnostics data to obtain event correlation. A probabilistic interference analysis may be performed to obtain conditional probabilities of the events for facilitating predictive analysis with respect to determining health/status checks for different diagnostic entities forming the cloud ecosystem state (block 436).

Figure 5A:
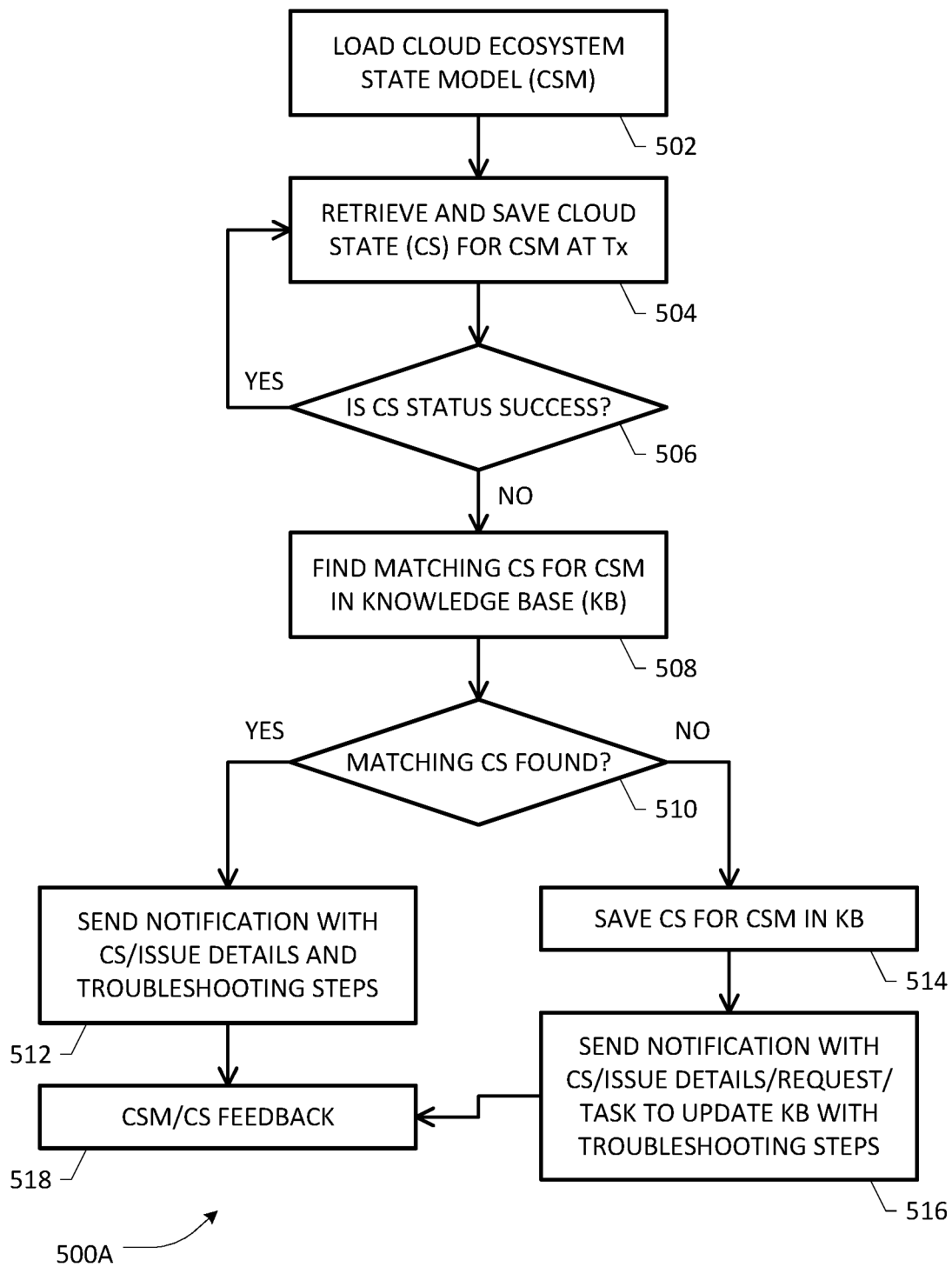
FIGS. 5A and 5B depict flowcharts illustrative of additional and/or alternative blocks, steps and/or acts that may be (re)combined in one or more arrangements, with or without blocks, steps and/or acts of additional flowcharts of the present disclosure according to one or more embodiments.
Figure 5B:
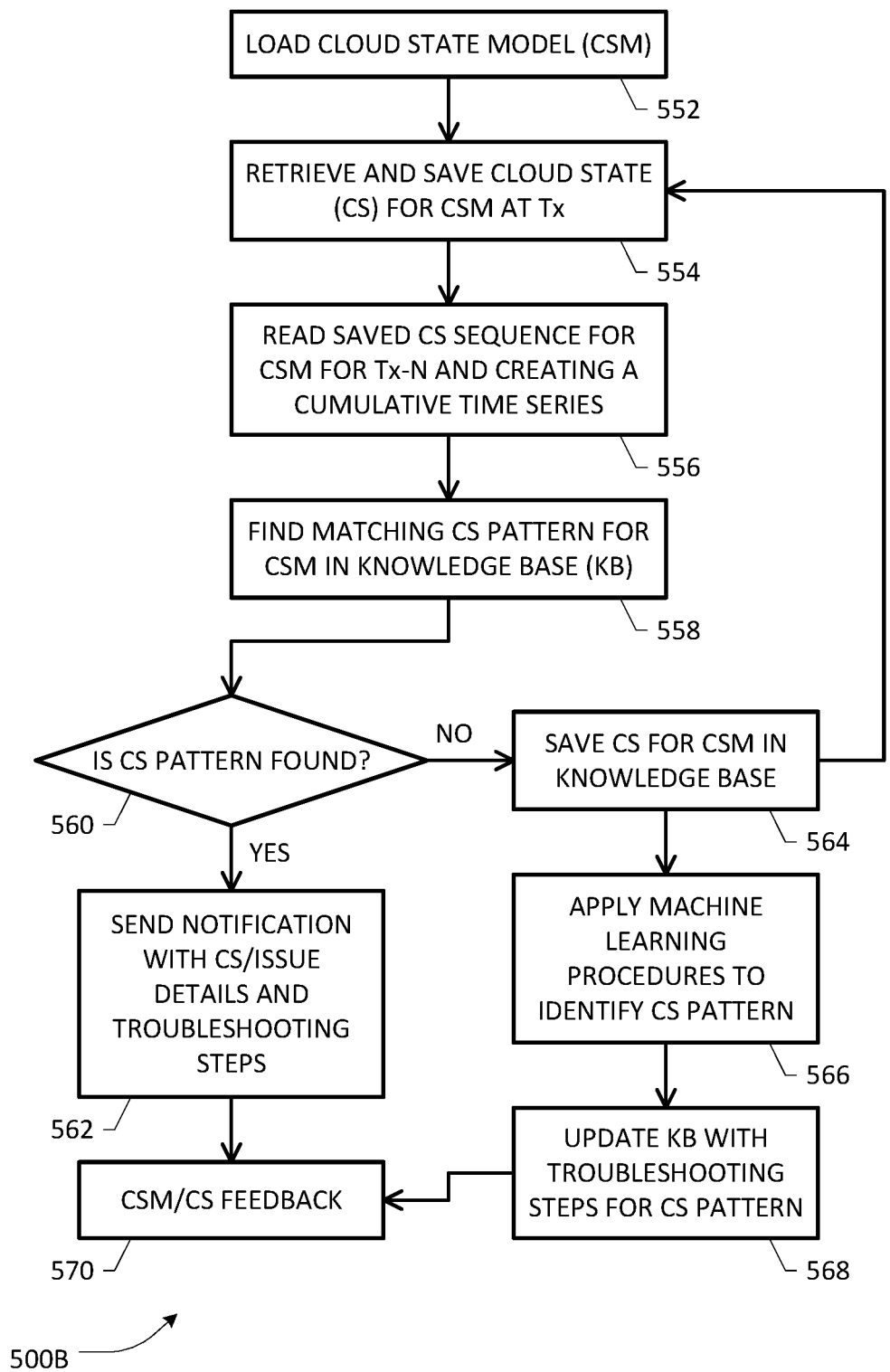

FIGS. 5A and 5B depict flowcharts illustrative of additional and/or alternative blocks, steps and/or acts that may be (re)combined in one or more arrangements, e.g., including one or more flowcharts described above, according to one or more embodiments of the present patent disclosure. Example process 500A shown in FIG. 5A is representative of a state analysis with respect to a cloud ecosystem state model describing a cloud-based network infrastructure. At block 502, the cloud ecosystem state (CS/CES) model, which may be stored at a diagnostics database (e.g., provided as part of a private, public, or hybrid service) in some implementations, may be loaded for execution. Responsive thereto, a cloud ecosystem state (CES) or cloud state (CS) comprising diagnostics data (i.e., a time-stamped record) corresponding to a particular time (e.g., Tx) is retrieved, obtained, or otherwise determined and saved (block 504) At block 506, a determination is made as to whether a status associated with the {CES(Tx)} is verified as a success. Skilled artisans will recognize that a variety of multivariate mathematical and statistical techniques may be used in such determinations. If the {CES(Tx)} status is determined to be successful, the flow control may return to retrieving/obtaining a CES at another subsequent time, e.g., after a preconfigured time and/or based on the occurrence of one or more triggering events in some embodiments. On the other hand, if the {CES(Tx)} status is found to be unsuccessful at status check determination of block 506, example process 500A may involve further determining whether there is a matching or substantially similar CES/CS stored in a reference database (e.g., a CES knowledgebase repository), as set forth at blocks 508 and 510. If there is no similar/matching CES found in the reference database, the {CES(Tx)} record is stored in the reference database (block 514). Thereafter, suitable notifications, including applicable indications as to any errors, threshold violations, etc., as well as appropriate recommendations, troubleshooting steps or corrective actions with respect to the unmatched (but now stored) {CES(Tx)} record may be generated, in addition to updating the reference database with such information, as generally set forth at block 516. In similar fashion, where there is a stored match found with respect to the {CES(Tx)} record, suitable notifications/recommendations corresponding to the matched record may be generated based on the retrieved data (block 512). Further, in an additional/alternative variation, regardless of whether a matching record/state is found, one or more feedback messages may be provided operative to adaptively update and/or reconfigure the CES model, associated cloud ecosystem state definition(s), etc., e.g., including updating at least one of the variable dimensionality and operational characteristics of the network portion virtualized as the cloud ecosystem infrastructure (block 518).

Whereas the foregoing process may be deemed as an example of "instantaneous" CES analysis (i.e., with respect to the state data at a particular instant of time and comparing it with an "instant" of stored CES record), additional and/or alternative embodiments may involve matching against a range of CES data obtained at or having different timestamps. Example process 500B shown in FIG. 5B is representative of a state analysis with respect to a cloud ecosystem state model describing a cloud-based network infrastructure wherein a time-series sequence of CES data over a configurable period of time are analyzed. Similar to process 500A, the CES/CS model may be loaded for execution (block 552). Responsive thereto, a CES/CS record comprising diagnostics data (i.e., a time-stamped record) corresponding to a particular time (e.g., Tx) is retrieved, obtained, or otherwise determined and saved (block 554). At block 556, a sequence of stored time-stamped records of the CES over a time window prior to the current/particular time is retrieved, loaded, or read from a local/temporary storage or otherwise obtained, wherein each stored record comprises diagnostic data corresponding to a respective time within the time window prior to the particular time (e.g., a plurality of records over a time period N prior to Tx, i.e., [Tx–N]). In one example embodiment, a cumulative time series of the time-stamped records comprising the current time-stamped record and the past time records may be created and/or used for finding a matching pattern of a sequence of stored CES records in a reference database (block 558). If there is a stored matching pattern found with respect to the cumulative time series of CES records, which may be treated as "states" or "a set of state values" at different times as previously noted, i.e., (State)t E {CES(Tx), CES(Tx–1), . . . , CES(Tx–N)}, applicable notifications, recommendations and other troubleshooting steps corresponding to the matched series may be generated, as set forth at blocks 560, 562. On the other hand, if there is no matching pattern of the cumulative time series of the CES, the current state, i.e., {CES(Tx)}, is stored in the reference database (block 564). A machine learning process, artificial intelligence (AI) process or an expert system process may be applied to a sequence including the stored {CES(Tx)} in order to identify a pattern as set forth at block 566. Thereafter, the reference database may be updated with suitable notifications, applicable indications as to any errors, threshold violations, etc., as well as appropriate recommendations, troubleshooting steps or corrective actions with respect to the identified sequence including the {CES(Tx)} record may be generated, in addition to updating the reference database with such information, as generally set forth at block 568. Additionally, the process flow may engage in retrieving the next cloud state. In a further variation, regardless of whether a matching CES pattern is found (e.g., as determined at block 560), one or more feedback messages may be provided operative to adaptively update and/or reconfigure the CES model, associated cloud ecosystem state definition(s), etc., as set forth at block 570, similar to the process flow 500A of FIG. 5A.

It will be realized that various multivariate mathematical and statistical techniques, e.g., involving cluster analysis, pattern recognition, AI/machine learning, string/sequence matching or searching, etc., as well as conditional probabilistic interference analyses, may used in any example embodiment of the foregoing processes as noted above, wherein the raw data obtained from diagnostics monitoring actions at one or more time points (e.g., state data) may be mined, manipulated, evaluated and/or compared against stored reference CES sets for purposes of the present patent application. In a further variation, techniques pertaining to "Big Data" analysis may also be used in conjunction with the foregoing for leveraging additional data that may be available with respect to the network infrastructure conditions, RAN cell site usage statistics, data traffic conditions, physical plant conditions, and the like. Such techniques may be provided in some embodiments in order to further modulate applicable diagnostic tests, functions and/or processing of the data measurements, as well as facilitating adaptive trainability the CES models, associated CES definitions and domain-specific knowledgebase components based on machine learning, input from human domain experts, neural networks, fuzzy logic, predictive adaptive learning, pattern recognition/matching, etc.

In the context of the foregoing, "Big Data" may be used as a term for a collection of data sets so large and complex that it becomes virtually impossible to process using conventional database management tools or traditional data processing applications. Challenges involving "Big Data" may include capture, curation, storage, search, sharing, transfer, analysis, and visualization, etc. Because "Big Data" available with respect to core network infrastructure components, RAN cell site diagnostic data, user data, network conditions data, Internet-of-Things (IoT)-based sensor data gathered from RAN cell site subsystems, industrial/residential environments etc., can be on the order of several terabytes to petabytes to exabytes, it becomes exceedingly difficult to work with using most relational database management systems for optimizing, ranking, indexing, cross-correlating test/measurement data and status data in typical environments. Accordingly, in one arrangement, applicable Big Data techniques may be implemented in a machine-learning framework that is optimized for storage and large-scale processing of data sets on clusters of commodity hardware. For example, techniques used to execute Big Data functionalities may include data dimension reduction methodologies such as MapReduce and classification analysis.

Example techniques with respect to pattern matching/searching may involve string metric analysis based on distance metrics such as, e.g., Levenshtein distance, Damerau distance, Hamming distance, approximate string matching, etc., as well as Pearson correlation techniques, Bayesian inference analysis, and the like, wherein patterns can be tree structures, sequences or other structures.

In an example embodiment, for a given series of cloud states, the following methodology may be executed to process raw data output, which can be applied to a single diagnostic entity or across multiple entities of the cloud ecosystem state model:

Clustering/Grouping: In this sub-process, cloud states that are similar or resemble are grouped together into "event" using the Levenshtein distance metric.

Correlation Analysis: Pearson Correlation is then applied on a sliding window of time (the larger the window the more accurate the pattern finding) to group events into a pattern which may be referred to as "cloud behavior," wherein the timestamps of the events in the pattern are preserved.

Conditional Probability Analysis: In this sub-process, the Bayesian theorem is applied on different patterns to predict the future outcome(s). For example, given the probability of event A occurred with events B and C, and event A occurred with events D and C (i.e., another pattern), the analysis allows a prediction as to whether A will occur when the other patterns are given.

By way of example, set forth below are illustrative techniques corresponding to the foregoing sub-processes, wherein the Levenshtein distance metric may be determined by the equation:

$$lev_{a,b}(i,j)=\max(i,j); \text{ if } \min(i,j)=0;$$

$$lev_{a,b}(i,j)=\min\{lev_{a,b}(i-1,j)+1, lev_{a,b}(i,j-1)+1, lev_{a,b}(i-1,j-1)+1(a_i \neq b_j)\}; \text{ otherwise,}$$

with the Longest Common Subsequence being given as:

$$c[i,j]=0; \text{ if } i=0 \text{ or } j=0;$$

$$c[i,j]=c[i-1,j-1]+1; \text{ if } i,j>0 \text{ and } x_i=y_j$$

$$c[i,j]=\max(c[i,j-1], c[i-1,j]); \text{ if } i,j>0 \text{ and } x_i \neq y_j$$

and wherein the Bayesian theorem for conditional probability between two events A and B is given as:

$$P(A|B)=\{P(B|A) \cdot P(A)\}/P(B),$$

where $P(A|B)$ and $P(B|A)$ are conditional probabilities and $P(B) \neq 0$;

and wherein the Pearson Correlation among multiple events (e.g., determined as an Event Correlation Coefficient or ECC) may be calculated based on an event occurrence matrix corresponding to sequences of sliding windows ($\Delta T$) as is known in the statistical and mathematical arts.

Figure 6:
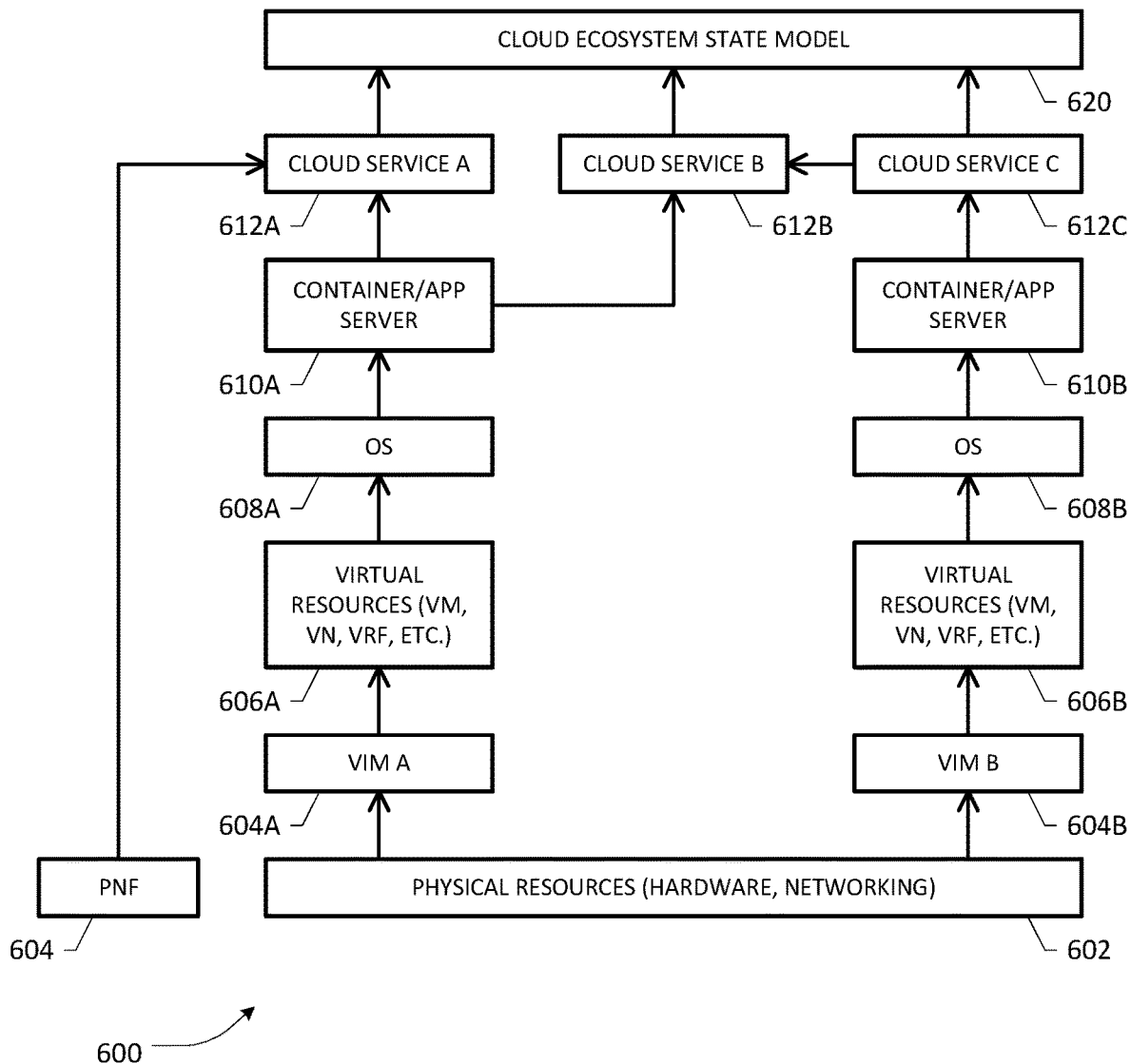
FIG. 6 depicts an example cloud ecosystem state model with inter-component dependencies according to some embodiments of the present invention.

Turning to FIG. 6, depicted therein is an example hierarchical CES model architecture 600 with inter-component dependencies according to some embodiments of the present invention. As illustrated, a top-level definition of example CES model 620 is comprised of multilevel definitions of various constituent infrastructure components that may be configured to provide one or more cloud services, e.g., Cloud Service A 612A, Cloud Service B 612B and Cloud Service C 612C. One or more physical network functions (PNFs) 604, which may comprise purpose-built hardware configured for specific network functions, may form a lower level definition with respect to one or more cloud services. Example PNFs may include, without limitation, hardware routers, switches, firewalls, load balancers, Session Border Controllers, etc. With respect to virtualized resources configured for supporting the cloud services, various intermediate level definitions may be provided depending on the degree and deployment architecture of virtualization. Hardware/networking resources 602 may be virtualized by way of one or more virtual infrastructure managers (VIMs) 604A and 604B, each of which may be independently configured for supporting different services. As exemplified, virtual resources 606A comprising, e.g., virtual machines (VMs), virtual network functions (VNFs), virtual routing and forwarding entities (VRFs), etc. are supported by VIM 604A, which in turn support one or more OS instances 608A. One or more containers and/or application servers 610A may be supported, wherein an OS may be virtualized so that multiple workloads can be executed on a single OS instance. Accordingly, two cloud services, Service 612A and Service 612B are supported by the containers/application servers 610A. In similar fashion, VIM B 604B is operative to support virtual resources 606B constituting suitable VMs, VNFs, VRFs, and the like. OS layer 608B is executable on the virtual resources 606B, which may be configured to support a container/application server layer 610B that is operative to support Cloud Service C 612C. In one arrangement, there may be inter-service dependencies as well, as exemplified by a dependency relationship between Cloud Service B 612B and Cloud Service C 612C.

Figure 7:
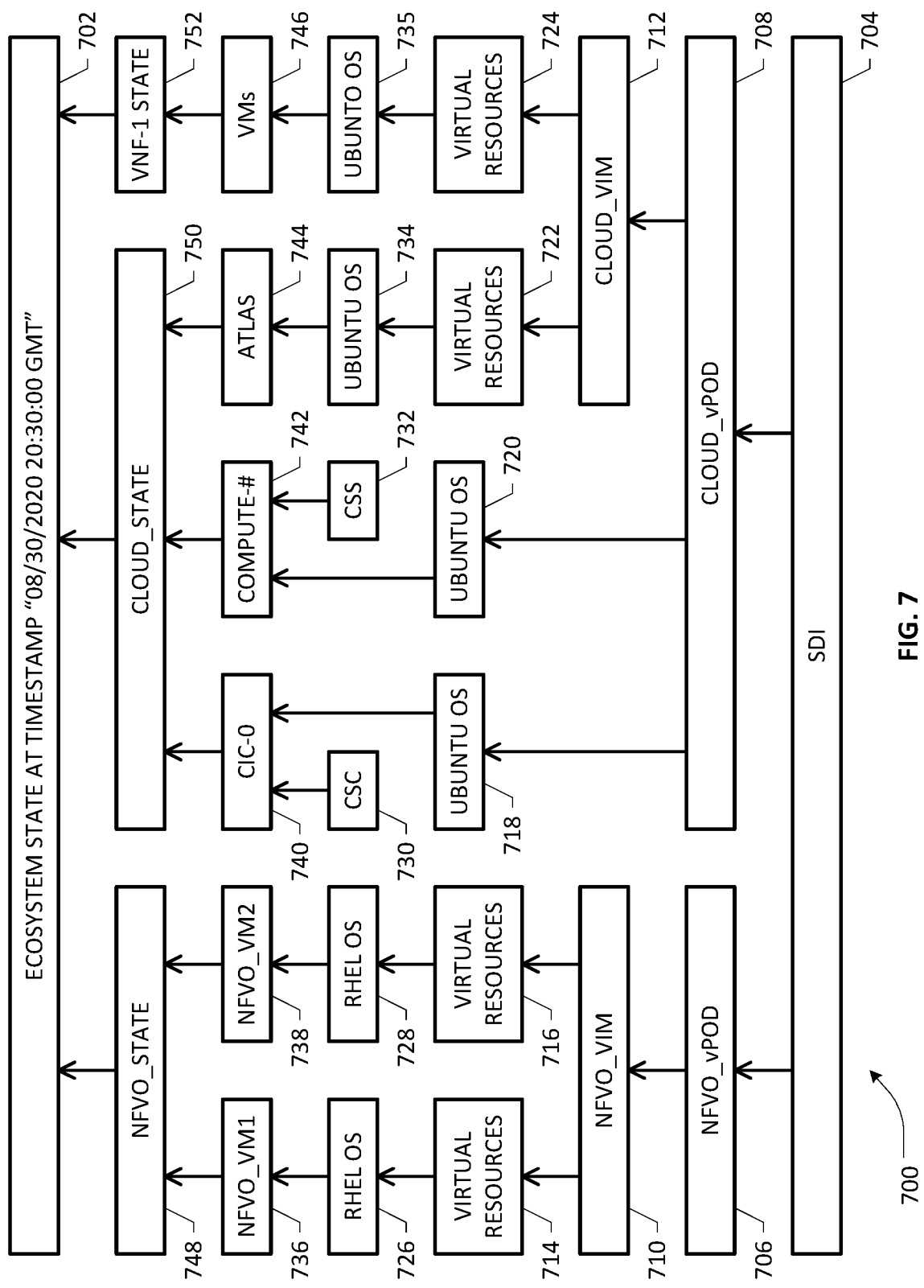
FIG. 7 depicts an example cloud ecosystem state as a time-stamped record of diagnostics data according to some embodiments of the present invention.

FIG. 7 depicts an example hierarchical CES architecture 700 having one or more inter-component dependencies with respect to an ecosystem state as a time-stamped diagnostics data record 702 according to some embodiments of the present invention. At one end of the state hierarchy, one or more top-level state components may comprise NFV Orchestrator (NFVO) State(s) 748, Cloud Execution State(s) 750 and VNF State(s) 752. An SDI/SDN layer 704, which may be implemented based on a hyperscale data center system in some arrangements, is operative to support various intermediary infrastructure components that give rise to corresponding state components depending on the CES model definition. With respect to NFVO State 748, example state components may comprise the following two sequences that may share one or more common components. A first sequence of state components involves NFVO Virtual Performance Optimized Data center (VPOD) 706, NFVO VIM 710, Virtual Resources 714, Enterprise Linux OS 726 (e.g., Red Hat Enterprise Linux or RHEL) and NFVO VM1 736. In similar fashion, a second sequence of state components for NFVO state 748 involves NFVO VPOD 706, NFVO VIM 710, Virtual Resources 716, RHEL OS 728 and NFVO VM2 738.

With respect to Cloud State 750, a plurality of state component sequences having variable number of components may be exemplified in similar manner. A first state component sequence involves Cloud VPOD 708, Ubuntu OS 718 and Cloud Infrastructure Controller (CIC) 740, which in turn includes Cloud SDN Controller (CSC) 730. A second state component sequence involves Cloud VPOD 708, Ubuntu OS 720 and Compute Resources 742, which in turn may include a Cloud SDN Switch (CSS) 732. A third state component sequence involves Cloud VPOD 708, Cloud VIM 712, Virtual Resources 722, Ubuntu OS 734 and ATLAS (Automatically Tuned Linear Algebra Software) component 744. A single sequence of state components is illustrated with respect to VNF-1 State 752, comprising Cloud VPOD 708, Cloud VIM 712, Virtual Resources 724, Ubuntu OS 735 and one or more VMs 746. As one skilled in the art will recognize, a tree structure of the diagnostics data corresponding to the various state components may therefore be formed as the time-stamped record 702 comprising a root state/node, multilayer intermediary nodes and a plurality of leaf nodes for a particular CES model depending on the model definition associated with a network.

Following table is an example cloud state model illustrated in respect of a 5G network solution at a data center having four workloads comprising IoT_1, vCORE, vIMS, IoT_2).

TABLE I

```
{
"state_model_name" : "5G_solution_cloud_state_model",
"diagnostic_entity_name" : "SiteA_5G_solution_cloud",
    "status" : "NULL",
    "sub_state" :
    [
        {
        "diagnostic_entity_name" : "ecm_coreVM",
        "endpoint" : "47.24.24.12",
        "endpoint_access" :
        {
            "username" : "abc",
            "password" : "xyz"
        },
        "health_check_command" : "script_to_check_services_state",
        "sub_state" :
        [
            {
            "diagnostic_entity_name" : "cee",
            "endpoint" : "43.12.34.13",
            "endpoint_access" :
            {
                "username" : "root",
                "password" : "456"
            },
            "health_check_command" : "script_ubuntu_healthcheck",
            "sub_state" :
            [
                {
                    "diagnostic_entity_name" : "Vfuel",
                    "endpoint" : "43.12.34.15",
                    "endpoint_access":
                    {
                        "username" : "root",
                        "password" : "789"
                    },
                    "health_check_command" : "script_vfuel_healthcheck",
                    "sub_state" :
                    [
                        {
                            "diagnostic_entity_name" : "Atlas",
                            "endpoint" : "43.12.34.17",
                            "endpoint_access" :
                            {
                                "username" : "root",
                                "password" : "234"
                            },
                            "health_check_command" : "script_atlas_healthcheck",
                            "sub_state" : [{ }]
                        },
                        {
                            "diagnostic_entity_name" : "Cic1 ",
                            ...
                        },
                        {
                            "diagnostic_entity_name" : "Cic2",
                            ...
                        }
                    ]
                }
            ]
        },
        {
            "diagnostic_entity_name" : "hds_ccm",
            "endpoint" : "47.24.25,41",
            "endpoint_access" :
            {
                "username" : "root",
                "password" : "987"
            },
            "health_check_command" : "script_ccm_healthcheck",
            "sub state" : [{ }]
```

TABLE I-continued

```
    },
    {
        "diagnostic_entity_name" : "sdn_csc",
        ...
    },
    {
        "diagnostic_entity_name" : "sdn_css",
        ...
    },
    ...
    {
        "diagnostic_entity_name" : "vnf_iot1",
        ...
    },
    {
        "diagnostic_entity_name" : "vnf_iot2",
        ...
    }
    ]
  }
  ]
}
```

Figure 8:
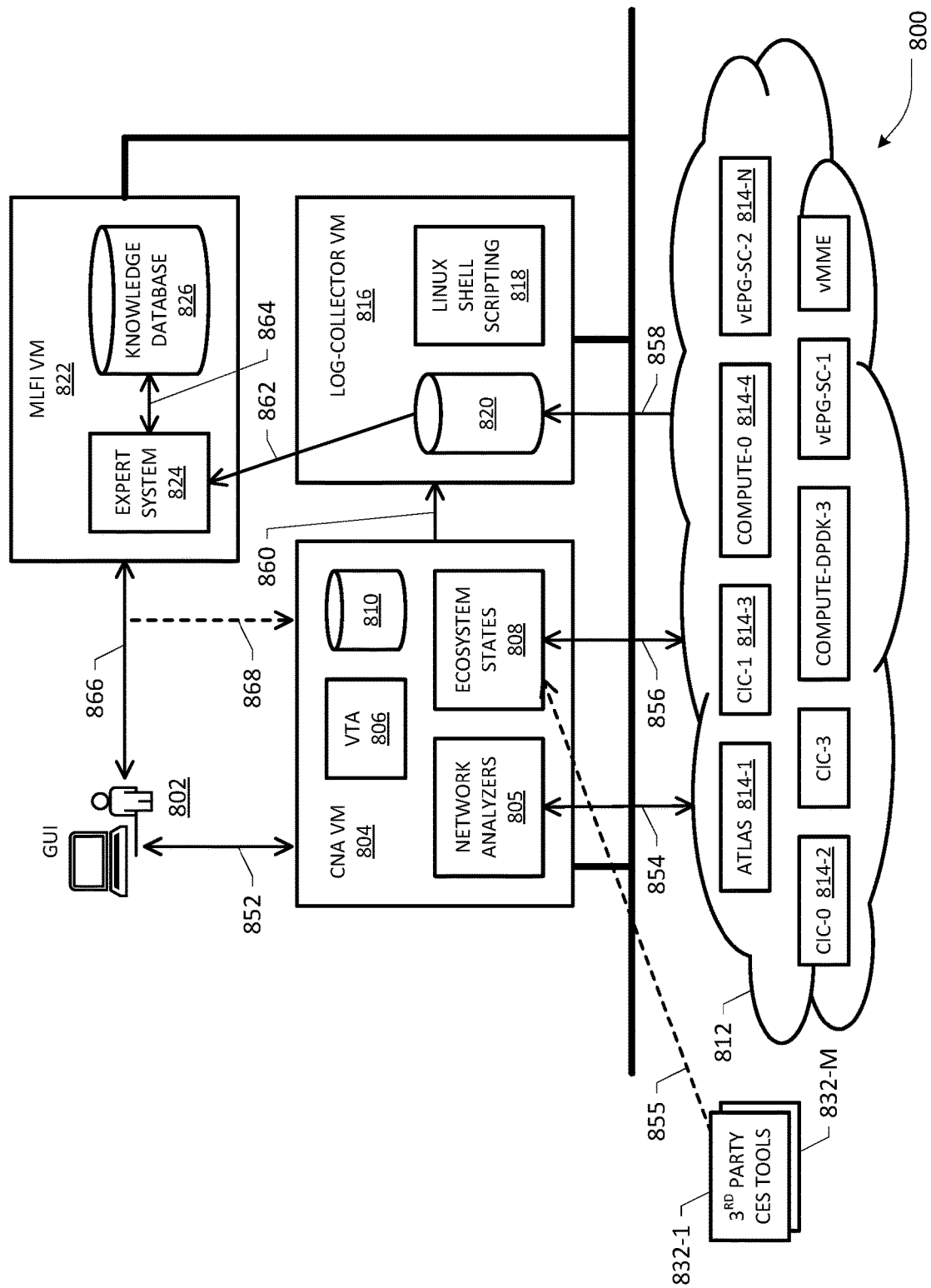
FIG. 8 depicts an example implementation of a cloud ecosystem diagnostics system according to some embodiments of the present invention.

FIG. 8 depicts an example implementation scheme 800 of a cloud ecosystem diagnostics system according to some embodiments of the present invention. One or more users or technicians operating suitable equipment, generally shown at reference numeral 802, may interact with a Cloud Network Analyzer (CNA) 804 via appropriate paths 852 to troubleshoot a cloud ecosystem 812 as illustrated. Consistent with the embodiments described hereinabove, a plurality of cloud-based infrastructure components 814-1 to 814-N, including Data Plane Development Kits or DPDKs for faster packet processing and Evolved Packet Gateways or EPGs, are exemplified with respect to the cloud ecosystem 812, requiring diagnostics monitoring, analysis and reporting. In the illustrated scheme 800, CNA 804 may be virtualized as a VM, which may be operative in conjunction with a Log-Collector VM 816, for executing the functionality of a cloud state monitoring module in accordance with the teachings of the present patent disclosure. A Multi Layer Fault Isolation (MLFI) VM 822 is likewise provided as representative of a cloud state analysis module. UE interoperating with suitable logic and graphic user interface (GUI) or other interface may be configured to operate as a cloud ecosystem state configuration module and notifications module for purposes of an example embodiment.

CNA VM 804 preferably includes a network analyzer 805, a virtual test agent (vTA) 806 and an ecosystem state check service logic or framework 808 that allows execution of predefined state checks, which may be augmented with advanced or enhanced state checks, dynamically reconfigurable checks, etc. A database 810 associated with CNA VM 804 may be configured to store applicable cloud state definitions and at least some portions of the diagnostics data. In some embodiments, an example cloud state definition may be configured such that it allows invoking one or more third-party CES tools 832-1 to 832-M on infrastructure components such as network portions, PNFs, proprietary or third-party nodes and devices.

Similar to CNA VM 804, other VMs configured to execute applicable portions of the cloud ecosystem diagnostics functionality, e.g., Log-Collector VM 816 and MLFI VM 822 may also be provided with corresponding databases as well as associated logic structures. By way of illustration, Log-Collector VM 816 may include a shell scripting software platform 818 and database 820. Likewise, a knowledge database 826 and associated expert system 824 may be provided as part of MLFI VM 822.

A sample CES workflow may involve a user commencing a diagnostics interaction with CNA VM 804 via flow path 852 as pointed out above in order to effectuate diagnostic checking with respect to one or more cloud ecosystem components, as exemplified by flow path 854. Applicable ecosystem states are checked, which may involve third-party CES tools in some embodiments, as exemplified by flow paths 855 and 856. Ecosystem state logs are collected, retrieved or otherwise obtained via flow path 858. In one example embodiment, logs of any state changes may also be obtained via flow path 860. The collected ecosystem state data as well as the state change data are provided to the expert system 824 via flow path 862 for performing various types of analyses, preferably in association with the knowledge database 826, as set forth in detail hereinabove. Further, the knowledge database 826 may also be updated as needed in response to the analysis output, e.g., via flow path 864. In addition, suitable recommendations, troubleshooting steps and other corrective actions may be provided to the user/UE 802 via flow path 866 for effectuating appropriate notifications. In a further embodiment, suitable feedback messages may be provided via flow path 868 to update the functionality of CNA VM 804.

Figure 9:
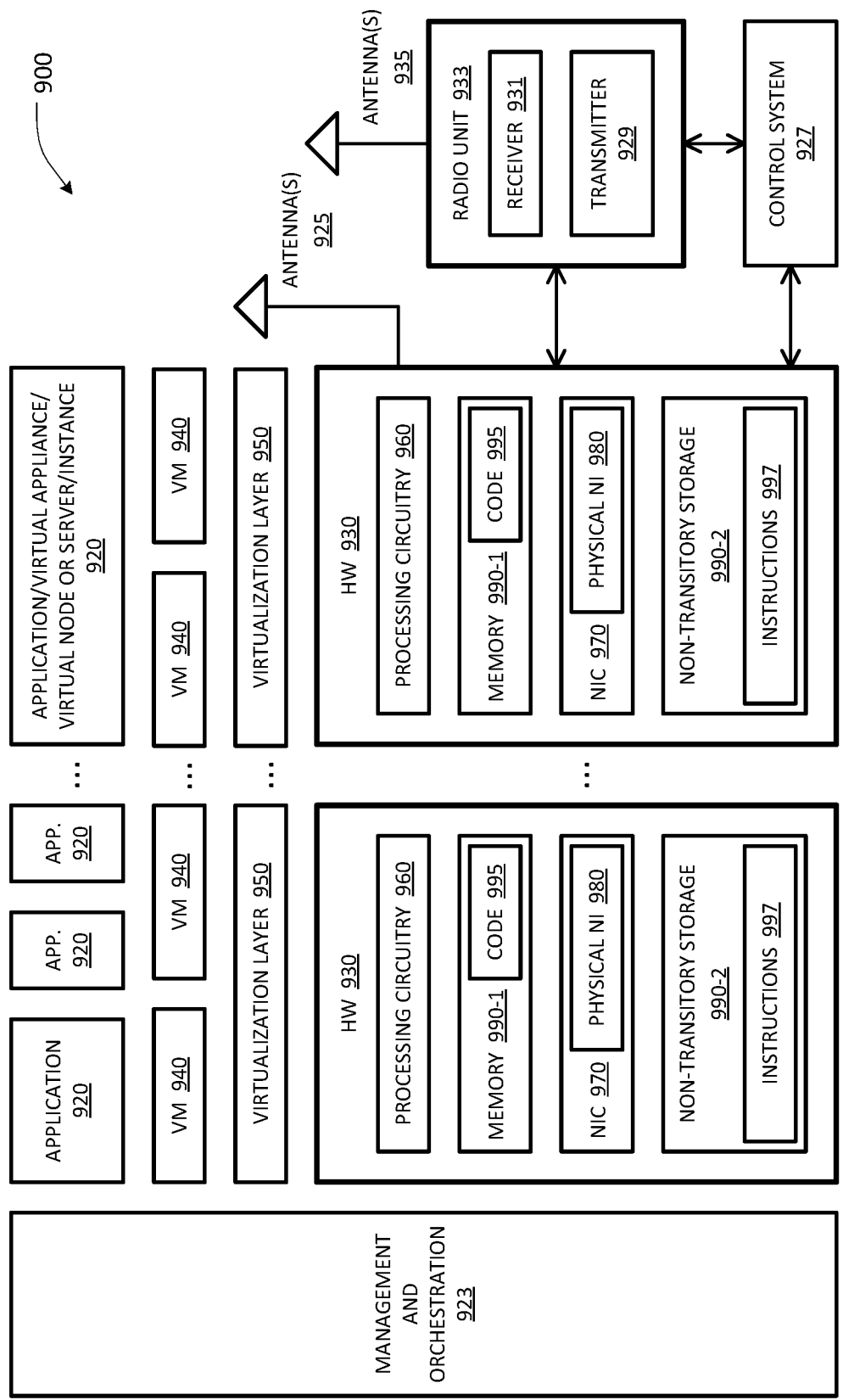
FIG. 9 depicts a virtualization environment operative in accordance with some embodiments of the present invention.

FIG. 9 is a schematic block diagram illustrating a virtualization environment 900 in which functions implemented by some embodiments may be virtualized. In the present context, "virtualizing" means creating virtual versions of apparatuses or devices, which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical/virtual processing nodes in one or more networks, e.g., internal networks, external networks, intranets, extranets, private/public/hybrid cloud networks, etc.).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

Various functionalities may be implemented by one or more applications 920 (which may alternatively be called software instances, virtual appliances, network functions, virtual nodes, virtual network functions, etc.), preferably operative to implement some of the features, functions, and/or benefits of some of the embodiments disclosed herein. Applications 920 are run in virtualization environment 900, which provides hardware 930 comprising processing circuitry 960 and memory 990-1. Memory 990-1 contains instructions or code portions 995 executable by processing circuitry 960 whereby application 920 is operative to provide one or more of the features, benefits, and/or functions disclosed herein.

Virtualization environment 900 may be implemented using general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 997 and/or instructions executable by processing circuitry 960. Software 997 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995/997 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Some hardware 930 may comprise antenna 925 and may implement some functions associated therewith via virtualization. Alternatively, hardware 930 may be part of a larger cluster of hardware (e.g. such as in a data center or customer premise equipment (CPE)) where many hardware nodes work together and are managed via management and orchestration (MANO) 923, which, among others, oversees lifecycle management of applications 920, and may be associated and/or integrated with an OSS/BSS platform. Further, an example UE or endpoint node may include one or more antennas 935 and a radio unit 933 having a receiver 931 and a transmitter 929, operative under a processor/control system 927, some of which aspects may also be virtualized in some arrangements (e.g., "thin" clients).

Virtualization of the hardware is in some contexts referred to as Network Function Virtualization (NFV), as pointed out elsewhere the present patent disclosure. NFV may be used to consolidate many network equipment types onto industry standard high volume server hardware, physical switches, and physical storage, which can be located in data centers, and customer premise equipment. In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network element (VNE). Still in the context of NFV, a VNF or Virtual Network Function is responsible for handling specific network functions that run in one or more virtual machines 940 on top of hardware networking infrastructure 930 and generally corresponds to application 920 in FIG. 9. A plurality of VNF managers may be provided as part of MANO 923 for managing and orchestrating the overall functionality of VNFs, at least a portion of which may related to one or more aspects of a cloud-based cloud diagnostics support and management application or service as disclosed herein.

Figure 10:
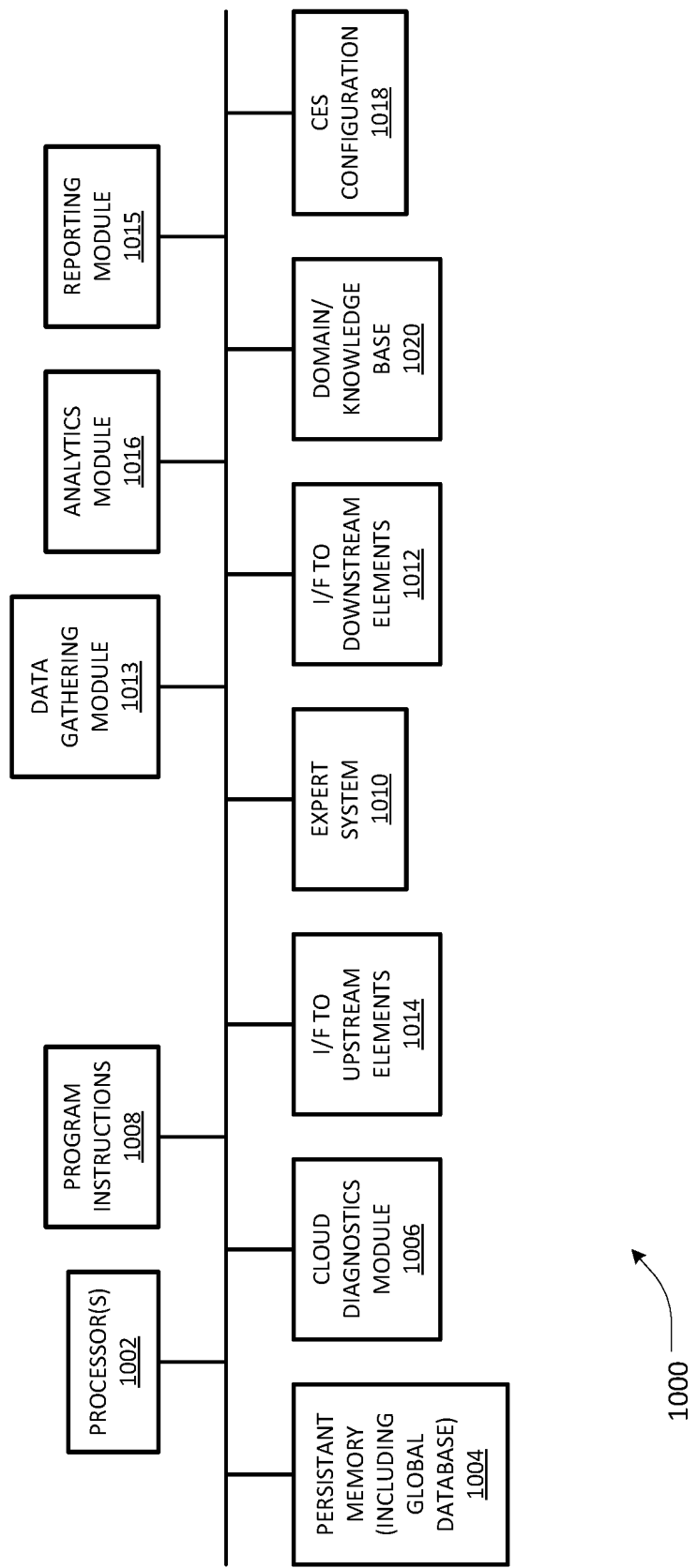
FIG. 10 depicts a block diagram of a computer-implemented apparatus that may be (re)configured and/or (re)arranged as a platform, node or element to effectuate an example cloud ecosystem diagnostics and support management system according to an embodiment of the present invention.

Turning to FIG. 10, depicted therein is a block diagram of a computer-implemented apparatus 1000 that may be (re) configured and/or (re)arranged as a platform, node or element to effectuate an example cloud ecosystem diagnostics and support management system according to an embodiment of the present invention. One or more processors 1002 may be operatively coupled to various modules that may be implemented in persistent memory for executing suitable program instructions or code portions with respect to effectuating various aspects of cloud ecosystem diagnostics and support management, e.g., data collection, processing, preparation, reporting, administration, analytics, etc., as exemplified by modules 1008, 1013, 1015, 1016, 1018. A persistent memory storage system 1004 for storing RAN cell site diagnostics data, core network infrastructure diagnostics data, virtualized infrastructure diagnostics data, etc. may be provided as local storage associated with apparatus 1000. A network analyzer or cloud diagnostics module 1006 may be configured to provide event driven or scheduled diagnostic requests to the cloud infrastructure as well as physical infrastructure as set forth hereinabove. One or more separate expert systems, machine learning modules or engines 1010 for training different aspects of the overall cloud diagnostics functionality may also included as part of apparatus 1000, which may operate in conjunction with a cloud diagnostics domain knowledge base 1020 in one arrangement. Depending on the actual implementation, appropriate "downstream" interfaces (I/F) 1012 and/or "upstream" I/Fs 1014 may be provided for effectuating a network fabric operative to connect with other databases, OSS/BSS nodes, NOCs, external Big Data analysis platforms, RAN cell site infrastructures, core network infrastructures, third-party CES tool providers, various classes of diagnostic tool user entities, operator policy management nodes, as well as other cloud-based RAN diagnostic centers and infrastructures, etc. Accordingly, depending on the context, interfaces selected from interfaces 1012, 1014 may sometimes be referred to as a first interface, a second interface, and the like.

Skilled artisans will appreciate that example embodiments of a cloud ecosystem diagnostics scheme of the present invention may be implemented in a service-oriented architecture, e.g., Software as a Service (SaaS), Platform as a Service (PaaS), Infrastructure as a Service (IaaS), Diagnostics as a Service (DaaS), etc., with multiple entities providing different features or aspects of an example embodiment of the present invention, wherein one or more layers of virtualized environments may be instantiated on commercial off the shelf (COTS) hardware as pointed out above. Further, example cloud-computing environments with which an embodiment of the present invention may be associated may comprise one or more of private clouds, public clouds, hybrid clouds, community clouds, distributed clouds, and multiclouds and interclouds (e.g., "cloud of clouds"), involving telecommunications networks, media transmission networks, data/computing networks, information technology (IT) networks, hosted services networks, etc. Accordingly, skilled artisans will appreciate that although some embodiments herein have been set forth in particular detail with respect to a cloud-based implementation of a communications network, the present invention is not limited thereto and any general cloud-based computing resources including various types of cloud applications may be managed and monitored for diagnostic purposes in accordance with the teachings herein. Typical application layer embodiments may involve generic cloud computing resources, wherein cloud applications or cloud "apps" may be architected as one or more software programs or platforms, where cloud-based and local components of an infrastructure setting work together. Such a service model relies on remote servers for processing logic that is accessed through a web browser with a continual Internet connection. Example cloud-based applications may encompass, without limitation, enterprise email, file storage and sharing, order entry, inventory management, customer relationship management (CRM), data collection, or financial accounting features, and the like.

Based on the foregoing, it will be realized that embodiments set forth herein advantageously overcome and/or otherwise address at least some of the following drawbacks and deficiencies alluded to elsewhere in the present patent disclosure. For example, current 4G-ready-to-5G and 5G solutions are based on complex and dynamic cloud ecosystem environments with a variety of diagnostic solutions/tools that cannot satisfy all practical demands. Another limitation is that existing cloud diagnostics solutions focus primarily on certain type of resources, i.e., virtual infrastructure, physical infrastructure or virtual applications, without taking into consideration the full diversity of modern enterprise cloud ecosystems including dependencies between various components. Further, existing cloud diagnostics solutions are not capable of providing predictive/preventive analysis using obtained diagnostic data as noted previously. Additional advantages and benefits of the present invention have been set forth elsewhere in the present patent disclosure.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a ROM circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, microcode, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. A method for providing intelligent support for a communications network, the method comprising:
configuring a cloud ecosystem state (CES) model with respect to at least a network portion of the communications network, wherein the CES model is operative to define a cloud ecosystem state comprising a plurality of variables having a scalable dimensionality based on one or more operational characteristics of the network portion and wherein the cloud ecosystem state corresponds to one or more time-stamped records of diagnostic data, the cloud ecosystem state including instructions regarding retrieving a diagnostic entity associated with the cloud ecosystem state and performing an evaluation of the diagnostic data of the diagnostic entity;
obtaining diagnostics data corresponding to the cloud ecosystem state from one or more infrastructure elements of the network portion;
analyzing the diagnostics data corresponding to the cloud ecosystem state and providing one or more feedback messages operative to adaptively update the cloud ecosystem state with respect to at least one of the scalable dimensionality of the plurality of variables or the operational characteristics of the network portion, such analyzing further comprising:
obtaining a time-stamped record of the cloud ecosystem state at a particular time;
performing a status check of the cloud ecosystem state with respect to the time-stamped record;
responsive to determining that the status check of the cloud ecosystem state is not successful, determining whether there is a similar cloud ecosystem state stored in a reference database; and
responsive to determining that there is no similar cloud ecosystem state found in the reference database, storing the time-stamped record of the cloud ecosystem state in the reference database and updating the reference database to include one or more corrective actions applicable with respect to the diagnostic data comprising the time-stamped record.

2. The method as recited in claim 1, further comprising determining that there is a similar cloud ecosystem in the reference database and generating one or more notifications responsive to the corrective actions with respect to the diagnostic data of the cloud ecosystem state obtained at the particular time.

3. The method as recited in claim 2, further comprising generating the one or more feedback messages for updating the CES model of the network portion and redefining the cloud ecosystem state associated with the updated CES model.

4. The method for providing intelligent support for a communications network of claim 1, wherein the network portion comprises at least one of a homogenous network, a heterogeneous network, a hybrid network, a multi-operator network, a logical network slice, a 3G network, a 4G network, a 5G network, a Next Generation Network (NGN), a multi-vendor network, a Software-Defined Network (SDN), a Self-Optimizing Network, or a Self-Organizing Network.

5. A method for providing intelligent support for a communications network, the method comprising:
configuring a cloud ecosystem state (CES) model with respect to at least a network portion of the communications network, wherein the CES model is operative to define a cloud ecosystem state comprising a plurality of variables having a scalable dimensionality based on one or more operational characteristics of the network portion and wherein the cloud ecosystem state corresponds to one or more time-stamped records of diagnostic data, the cloud ecosystem state including instructions regarding retrieving a diagnostic entity associated with the cloud ecosystem state and performing an evaluation of the diagnostic data of the diagnostic entity;
obtaining diagnostics data corresponding to the cloud ecosystem state from one or more infrastructure elements of the network portion;
analyzing the diagnostics data corresponding to the cloud ecosystem state and providing one or more feedback messages operative to adaptively update the cloud ecosystem state with respect to at least one of the scalable dimensionality of the plurality of variables or the operational characteristics of the network portion, such analyzing further comprising:
obtaining a time-stamped record of the cloud ecosystem state at a particular time;

retrieving a sequence of stored time-stamped records of the cloud ecosystem state over a configurable timing window prior to the particular time, each stored time-stamped record comprising diagnostic data corresponding to a respective time within the configurable timing window prior to the particular time;

generating a cumulative time series of the time-stamped records including the time-stamped record at the particular time and the retrieved sequence of the stored time-stamped records over the configurable timing window;

determining if a matching pattern of the cumulative time series of the time-stamped records associated with the cloud ecosystem state exists in a reference database;

responsive to determining that there is no matching pattern of the cumulative time series of the time-stamped records in the reference database, performing:

storing the time-stamped record of the cloud ecosystem state obtained at the particular time in the reference database;

applying machine learning to identify a pattern including the time-stamped record for the cloud ecosystem state; and updating the reference database to include one or more corrective actions applicable with respect to the identified pattern including the time-stamped record.

6. The method as recited in claim 5, further comprising determining that there is a matching pattern of the cumulative time series in the reference database and generating one or more notifications responsive to the corrective actions with respect to the diagnostic data of the cloud ecosystem state obtained at the particular time.

7. The method as recited in claim 5, wherein the cumulative time series associated with the cloud ecosystem state are analyzed for pattern identification based on:

grouping the time series into multiple events based on a distance metric determination;

applying a correlation over a sliding time window for the multiple events to obtain sample patterns; and applying a conditional probabilistic inference to the sample patterns to predict a matching pattern for the cumulative time series.

8. The method as recited in claim 5, further comprising generating the one or more feedback messages for updating the CES model of the network portion and redefining the cloud ecosystem state associated with the updated CES model.

9. A non-transitory machine-readable storage medium having program instructions thereon, which are configured to effectuate an intelligent diagnostics support system for a communications network when executed by one or more processors of a network diagnostics center, the non-transitory machine-readable storage medium comprising:

a code portion to configure a cloud ecosystem state (CES) model with respect to at least a network portion of the communications network, wherein the CES model is operative to define a cloud ecosystem state comprising a plurality of variables having a scalable dimensionality based on one or more operational characteristics of the network portion and wherein the cloud ecosystem state corresponds to one or more time-stamped records of diagnostic data, the cloud ecosystem state including instructions regarding retrieving a diagnostic entity associated with the cloud ecosystem state and performing an evaluation of the diagnostic data of the diagnostic entity;

a code portion for obtaining diagnostics data corresponding to the cloud ecosystem state from one or more infrastructure elements of the network portion;

a code portion for analyzing the diagnostics data corresponding to the cloud ecosystem state and providing one or more feedback messages operative to adaptively update the cloud ecosystem state with respect to at least one of the scalable dimensionality of the plurality of variables or the operational characteristics of the network portion;

a code portion for obtaining a time-stamped record of the cloud ecosystem state at a particular time;

a code portion for performing a status check of the cloud ecosystem state with respect to the time-stamped record;

a code portion, responsive to determining that the status check of the cloud ecosystem state is not successful, for determining whether there is a similar cloud ecosystem state stored in a reference database; and a code portion, responsive to determining that there is no similar cloud ecosystem state found in the reference database, for storing the time-stamped record of the cloud ecosystem state in the reference database and updating the reference database to include one or more corrective actions applicable with respect to the diagnostic data comprising the time-stamped record.

10. The non-transitory machine-readable storage medium as recited in claim 9, further comprising a code portion for determining that there is a similar cloud ecosystem state in the reference database and generating one or more notifications responsive to the corrective actions with respect to the diagnostic data of the cloud ecosystem state obtained at the particular time.

11. The non-transitory machine-readable storage medium as recited in claim 10, further comprising a code portion for generating the one or more feedback messages for updating the CES model of the network portion and redefining the cloud ecosystem state associated with the updated CES model.

12. The non-transitory machine-readable storage medium as recited in claim 9, wherein the CES model is configured for the network portion infrastructure comprising one or more virtual machines, one or more virtual networks, one or more virtual storage units, one or more virtual compute resources, one more application servers, one or more operating systems, one or more virtual infrastructure managers, one or more virtual network functions, one or more physical network functions, and one or more physical infrastructure components including processors, memory components, fronthaul components, backhaul components, Global Positioning System (GPS) components, baseband (BB) components, transceiver components, antenna components, radio components, equipment enclosure and chassis components, network interface cards, ports, and power components.

13. The non-transitory machine-readable storage medium as recited in claim 9, wherein the CES model is configured for the network portion infrastructure comprising at least one of a homogenous network, a heterogeneous network, a hybrid network, a multi-operator network, a logical network slice, a 3G network, a 4G network, a 5G network, a Next Generation Network (NGN), a multi-vendor network, a Software-Defined Network (SDN), a Self-Optimizing Network, or a Self-Organizing Network.

14. A non-transitory machine-readable storage medium having program instructions thereon, which are configured to effectuate an intelligent diagnostics support system for a communications network when executed by one or more processors of a network diagnostics center, the non-transitory machine-readable storage medium comprising:

a code portion to configure a cloud ecosystem state (CES) model with respect to at least a network portion of the communications network, wherein the CES model is operative to define a cloud ecosystem state comprising a plurality of variables having a scalable dimensionality based on one or more operational characteristics of the network portion and wherein the cloud ecosystem state corresponds to one or more time-stamped records of diagnostic data, the cloud ecosystem state including instructions regarding retrieving a diagnostic entity associated with the cloud ecosystem state and performing an evaluation of the diagnostic data of the diagnostic entity;

a code portion for obtaining diagnostics data corresponding to the cloud ecosystem state from one or more infrastructure elements of the network portion;

a code portion for analyzing the diagnostics data corresponding to the cloud ecosystem state and providing one or more feedback messages operative to adaptively update the cloud ecosystem state with respect to at least one of the scalable dimensionality of the plurality of variables or the operational characteristics of the network portion;

a code portion for obtaining a time-stamped record of the cloud ecosystem state at a particular time;

a code portion for retrieving a sequence of stored time-stamped records of the cloud ecosystem state over a configurable timing window prior to the particular time, each stored time-stamped record comprising diagnostic data corresponding to a respective time within the configurable timing window prior to the particular time;

a code portion for generating a cumulative time series of the time-stamped records including the time-stamped record at the particular time and the retrieved sequence of the stored time-stamped records over the configurable timing window;

a code portion for determining if a matching pattern of the cumulative time series of the time-stamped records associated with the cloud ecosystem state exists in a reference database;

a code portion, responsive to determining that there is no matching pattern of the cumulative time series of the time-stamped records in the reference database, for performing:

storing the time-stamped record of the cloud ecosystem state obtained at the particular time in the reference database;

applying machine learning to identify a pattern including the time-stamped record for the cloud ecosystem state; and updating the reference database to include one or more corrective actions applicable with respect to the identified pattern including the time-stamped record.

15. The non-transitory machine-readable storage medium as recited in claim 14, further comprising program instructions for determining that there is a matching pattern of the cumulative time series in the reference database and generating one or more notifications responsive to the corrective actions with respect to the diagnostic data of the cloud ecosystem state obtained at the particular time.

16. The non-transitory machine-readable storage medium as recited in claim 14, wherein the code portion for determining a matching pattern with respect to the cumulative time series associated with the cloud ecosystem further comprises program instructions configured to perform:

grouping the time series into multiple events based on a distance metric determination;

applying a correlation over a sliding time window for the multiple events to obtain sample patterns; and applying a conditional probabilistic inference to the sample patterns to predict a matching pattern for the cumulative time series.

17. The non-transitory machine-readable storage medium as recited in claim 14, further comprising program instructions for generating the one or more feedback messages for updating the CES model of the network portion and redefining the cloud ecosystem state associated with the updated CES model.

* * * * *